United States Patent
Kitchen et al.

(10) Patent No.: US 6,289,322 B1
(45) Date of Patent: Sep. 11, 2001

(54) ELECTRONIC BILL PROCESSING

(75) Inventors: Bill Kitchen, Westerville; Ginger B. Moses, Lewis Center; Ralph Au, Powell; Clarence M. Bringardner, Columbus; Kenneth W. Bradley, III, Westerville, all of OH (US)

(73) Assignee: CheckFree Corporation, Norcross, GA (US)

( * ) Notice: Subject to any disclaimer, the term of this patent is extended or adjusted under 35 U.S.C. 154(b) by 0 days.

(21) Appl. No.: 09/034,561

(22) Filed: Mar. 3, 1998

(Under 37 CFR 1.47)

(51) Int. Cl.[7] ............................................. G06F 17/60
(52) U.S. Cl. .................. 705/40; 705/34; 705/39; 705/42; 705/78; 380/70; 380/77; 380/79
(58) Field of Search ................ 705/40, 34, 39, 705/78, 42; 380/70, 77, 79

(56) References Cited

U.S. PATENT DOCUMENTS

| | | | |
|---|---|---|---|
| 5,220,501 | 6/1993 | Lawlor et al. | 705/40 |
| 5,287,270 | 2/1994 | Hardy et al. | 705/34 |
| 5,325,290 | 6/1994 | Cauffman et al. | 705/34 |
| 5,383,113 | 1/1995 | Kight et al. | 705/40 |
| 5,465,206 | 11/1995 | Hilt et al. | 705/40 |
| 5,483,445 | 1/1996 | Pickering | 705/40 |
| 5,655,089 | 8/1997 | Bucci | 705/40 |
| 5,699,528 | * 12/1997 | Hogan | 705/40 |
| 5,873,072 | * 2/1999 | Kight et al. | 705/40 |
| 5,930,759 | * 7/1999 | Moore et al. | 705/2 |
| 5,956,700 | * 9/1999 | Landry | 705/40 |

FOREIGN PATENT DOCUMENTS 2 294 566 A * 1/1996 (GB) ............... G06F/19/00

OTHER PUBLICATIONS

Dialog file 6, 05424287, Shira Levine, Billing with an attitude, America's Network, p78, Jan. 15, 1998.*

* cited by examiner

Primary Examiner—Eric W. Stamber
Assistant Examiner—Raquel Alvarez
(74) Attorney, Agent, or Firm—Alfred Stadnicki

(57) ABSTRACT

A method of electronically presenting billing information, includes receiving billing information associated with a plurality of different billers, different portions of which represent bills for different payors. Requests are received from respective payors for current billing information, responsive to which bill presentment information corresponding to the applicable portion of the billing information is transmitted to the requesting payor.

19 Claims, 20 Drawing Sheets

Enrollment Select Biller

*Please Select*

- *Please Select*
- BELLSOUTH TELECOMMUNICA
- CAPSTEAD MORTGAGE *
- CONSUMERS ENERGY
- CUNA MUTUAL GROUP
- Columbia Gas of Ohio *
- Florida Power & Light
- GPU ELECTRIC PENELEC *
- GPU ENERGY JCPL
- CPU ENERGY METED
- Portland General Electric
- SMALL BUSINESS ADMINISTRA

ACCT NO.

PLEASE INSERT
BILLER NAME
BILLER ADDRESS
ACCT NO.

FIG. 4

Enrollment Personal Information

First Name  MI  Last Name

Social Security #  Mother's Maiden Name

Street Address

City  State 'Please Select' ▼  Zip

Home Phone  Work Phone

FIG. 5

1120 $ PAY   1125 DELETE

BELL SOUTH    ELECTRONIC BILLING NOTICE

| TOTAL PAYMENT $228.40 | John Riley 1234 Main Street Anytown, USA 65434 |
| DUE DATE September 10, 1998 | |

BELLSOUTH  Account Number:  770 555-1247 240 1886
                Bill Period Date:  September 1, 1998

Summary of Charges

Current Charges
BellSouth
    Monthly Service Charges ..............................................219.96
    Other Charges and Credits .......................................... 1.20
    Itemized Calls ....................................................... 2.61
    Taxes ................................................................ 4.63
Total Current Charges for BellSouth Companies ................ 228.40
Total Current Charges Due Before Mar 4 .......................... 228.40
    Total Current Charges include the following amounts:
    Regulated Charges ............................. 65.74
    Nonregulated Charges ......................... 162.66
Total Amount Due ................................................... 228.40

Payment List

1300

Payment List ☰[?]

| Biller | Date | Amount | Recurrence | Confirm # | Status | Action |
|---|---|---|---|---|---|---|
| Lakewood Racquet Club | 10/25/1997 | 105.00 | Monthly | WPBI-3M55021QJ | Pending | Stop/Edit |
| Lakewood Racquet Club | 09/25/1997 | 105.00 | Monthly | WPBI-3M55-21QJ | Processed: 09/22/1997 Check #. E-Pay | Inquire |
| Kim Heyde | 09/10/1997 | 1.00 | - | WPBI-4010-36EC | Processed: 09/22/1997 Check #. E-Pay | Inquire |

ELECTRONIC BILL PROCESSING

TECHNICAL FIELD

The present invention relates generally to electronic commerce and more particularly to electronic presentation of an aggregation of bills from different billers.

BACKGROUND ART

Historically the billing process has been a three party process. More particularly, the typical billing process consists of billers, such as merchants, utility companies, service providers and bankcard companies, preparing hardcopy paper bills either directly or through an independent bill preparation service provider. The bills normally consist of detailed billing information relating to the goods or services purchased or ordered, including a detailed itemization of the billed charges. The billing information also includes the total charge, due date for payment and, in many cases, the minimum amount which must be paid by the due date.

The hardcopy billing information relating to each individual biller is then placed in a separate envelope and mailed through the postal service to the applicable payor. The envelope may also be stuffed with other materials such as other product offerings, e.g., special discounts or new goods or services. Hence, each payor has historically received billing information from each biller as an individual hardcopy piece of correspondence received by mail.

Most, although not all, billers bill on a periodic basis, such as each calendar month or every thirty days. However, although billers may issue bills covering similar periods of time, e.g., thirty day periods, individual billers may have billing cycles and bill issue dates which vary. For example, some monthly billers may have a billing period which extends from the fifteenth of one month to the fifteenth of the next month, while other billers may have a monthly billing period which extends from the last day of one month to the last day of the following month. Further, even if different billers bill charges incurred over identical periods, the issue dates of the bills can vary widely. Accordingly, payors typically receive bills at various times throughout, for example, any given calendar month.

To complete the billing process individual payors have historically made payments directly to each individual biller by hardcopy paper check drawn against a financial institution and mailed via the postal service to the biller's remittance center. A returnable portion of the billing information received from the biller is typically returned with the check. The biller must then present the check for payment through the payor's financial institution before the payment funds can be actually received by the biller and applied against the payors account.

Systems have been implemented to allow payors to pay bills electronically. For example, U.S. Pat. No. 5,383,113 which is assigned to the assignee of the present application, discloses a system for electronic payment of bills received by individual payors from various billers. Recent improvements have been made in electronic bill payment systems, such as those disclosed in U.S. patent application Ser. No. 08/994,047 entitled An Electronic Bill Payment System with Merchant Identification, filed on Dec. 19, 1997 and U.S. patent application Ser. No. 09/010,193, entitled Dual Source Remittance Processing, filed on Jan. 21, 1998, both of which are also assigned to the assignee of the present application and are incorporated herein by reference. Such systems allow the payor, using a home or office computing device, e.g. a personal computer, to access a centralized payment station, e.g. a server, via a network. Based upon the payor's authorization, the centralized station can access funds in the payor's checking account at a financial institution to pay various billers in accordance with payment instructions received from the payor via the network. The payments may be made either by electronic funds transfer or by hardcopy paper check to the individual billers.

Although advances in electronic bill payment systems have significantly automated remittance processing, these systems have not eliminated the need for payors to continue to receive large numbers of hardcopy paper bills from individual billers. Hence, bill presentment has remained a tedious and expensive task both in terms of the preparation and the distribution of billing information.

Recently, a centralized bill presentation system has been proposed. As proposed, billing information is forwarded to a centralized system by multiple billers. The received billing information is accumulated over some prespecified period of time corresponding to a billing cycle and then forwarded in a single transmission to the applicable payors. Although the proposed system could result in some reduction in the cost of distributing bills, it has numerous disadvantages.

For example, since the proposed system transmits billing information to an individual payor only after bills from different billers have been accumulated over a predefined period of time, such as a calendar month, bills which have been issued early in the cycle may be received too late to avoid charges for late payment. Further, since billing information is only made available after the completion of a full billing cycle, even if a particular payor would prefer to review and pay bills on an ongoing basis throughout the billing cycle, the payor must wait until after the end of the cycle to receive a single batch of bills. The payor will therefore need to allocate a large block of time after receipt of the transmitted accumulated billing information to review and pay the associated bills. Hence, the proposed system is inflexible in dealing with individual payor demands. Although the proposed system may electronically transmit the accumulated billing information to the payors, because all information is sent in a single transmission significant communications network resources will be required for each transmission if detailed billing information is to be provided to each payor.

OBJECTIVES OF THE INVENTION

Accordingly, it is an object of the present invention to provide a technique for electronically presenting billing information in a manner which facilitates the timely payment of bills by payors.

It is another object of the present invention to provide a technique for electronically presenting billing information from different billers when desired by the payor.

It is a further object of the present invention to provide a technique for electronically presenting bills in a form desired by a payor.

Additional objects, advantages, novel features of the present invention will become apparent to those skilled in the art from this disclosure, including the following detailed description, as well as by practice of the invention. While the invention is described below with reference to a preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

In accordance with the invention, an electronic bill presentment system includes a memory, such as an electrical or optical storage device, a processor, such as a high speed microprocessor, and a communications network interface. The system may take the form of one or more servers interconnected to a private or public bill presentation network, e.g. the Internet.

The memory stores billing information, associated with various billers, representing bills for various payors. Preferably the billing information is received from the billers or their representatives, e.g. bill consolidators, via the network interface and is stored on the memory by the processor in association with an identifier of the appropriate payor.

In a typical operational sequence, the processor accesses the memory to read the stored billing information. Using this information, the processor generates bill presentment information which corresponds to a portion of the billing information which represents bills for a first payor. The processor also generates bill presentment information which corresponds to other portions of the billing information which represents bills for other payors. The bill presentment information may relate to paid bills, unpaid bills or bills having another desired status, or any combination thereof. The bill presentment information, may be a detailed bill which includes all the applicable billing information, could be a summary of the applicable billing information, or could be a simple retransmission of all or some of the applicable billing information. Some or all of the bill presentment information may also be stored in the memory.

Preferably, the bill presentment information includes a summary listing of all bills of a desired status, such as all paid or unpaid bills. Beneficially, the bill presentment information includes a listing of respective billed amounts owed by the payor to a number of the different billers, which can be presented as one or more pages on a display, such as the monitor of a payor's home or office computer. The bill presentation information could also include a formatted version of all the applicable billing information, such as a full detailed presentation of a bill, which can be presented on a display so as to appear substantially similar to the conventional hardcopy bills which are regularly received by mail today.

The processor generates signals directing transmission of the applicable bill presentment information responsive to requests for current billing information, received by the network interface, from respective payors. The network interface transmits the applicable bill presentment information to the appropriate payor responsive to the applicable signal.

Preferably, the processor generates a notice of availability of current billing information to each of the payors for whom billing information has been received by the system and stored in the memory. In this regard, the processor generates a signal directing the transmission of each notice, responsive to which the network interface transmits a respective notice to the appropriate payor. Each notice may be an e-mail message addressed to the network e-mail address, e.g. an Internet e-mail address, of the appropriate payor.

According to other aspects of the invention, the processor may also generate a further notice of availability of current billing information and a signal directing the transmission of this further notice to a payor after some period of time has passed subsequent to the applicable billing information having been first noticed to or requested by the payor. For example a further notice may be generated if no request for bill presentment information is received for some period of time after a first notice of availability has been transmitted. An additional notice may also or alternatively be generated if no notice of payment of some or all of the bills represented the applicable portion of the billing information has been received by the system for some period of time after bill presentment information has been requested by a payor, transmitted to a payor or viewed by a payor. The network interface transmits this further notice to the applicable payor responsive to the signal.

According to further aspects of the invention, the processor may continuously update the bill presentation information based upon the new bill related information, such as additionally received billing information representing new bills to be paid or the payment of bills which were represented by billing information previously received by the applicable payor. In this regard, the processor, if desired, can generate new bill presentment information corresponding to some or all of the portion of the old billing information which represents bills for a particular payor, e.g. that which represents only those bills which have been paid or remain unpaid, and the portion of the new billing information which represents bills for the same payor, e.g. newly paid bills or new outstanding bills. If, for example all the bills represented by the applicable portion of the old billing information have been paid, the new bill presentment information would only include the applicable portion of the new billing information. This new billing information may be associated with the same and/or different billers as the previously received billing information, but would more typically relate to different billers. The processor also generates a signal directing the transmission, via the network interface, of the new bill presentment information to the applicable payor responsive to the payor's request for the then current billing information.

In accordance with a further embodiment of the invention, an electronic bill presentment network is provided. The electronic bill presentment network includes a private or public communications network, such as the Internet, interconnecting multiple biller stations, multiple client stations and a network server.

The biller stations each transmit the billing information associated with a respective one of the different billers to the server via the network. The network server receives and stores the transmitted billing information. The received information is stored such that the portion of the billing information representing bills for a particular payor is associated with that payor. Using a client station a payor can transmit, via the network, a request for current billing information. The network server receives each payor request and transmits bill presentment information, which corresponds to an appropriate portion of the billing information, to the applicable payor client station via the network responsive to the request.

As discussed above, if desired, the network server can transmit a notice of availability of current billing information to payors via the network. The client stations may transmit, subsequent to the transmission of a first request for current billing information, one or more additional request for then current billing information via the network. Hence, applicable current bill presentation information will be provided on-demand to the payor.

Beneficially, the network server receives notification of the payment of bills represented by the respective portion of the billing information applicable to each payor. In such a case, the network server only transmits or retransmits that part of the applicable bill presentment information which corresponds to the portion of the billing information representing the remaining unpaid bills via the network responsive to a payor request for information regarding outstanding bills which is received by the network server after receipt of the notice of payment.

BRIEF DESCRIPTION OF DRAWINGS

FIG. 4 depicts a payor enrollment screen in accordance with the present invention.

FIG. 5 depicts another payor enrollment screen in accordance with the present invention.

FIG. 11 depicts bill presentment information which includes a detailed bill screen in accordance with the present invention.

FIG. 13 depicts bill presentment information which includes a listing of information related to bills which have been authorized for payment in accordance with the present invention.

BEST MODE FOR CARRYING OUT THE INVENTION

Figure 1:
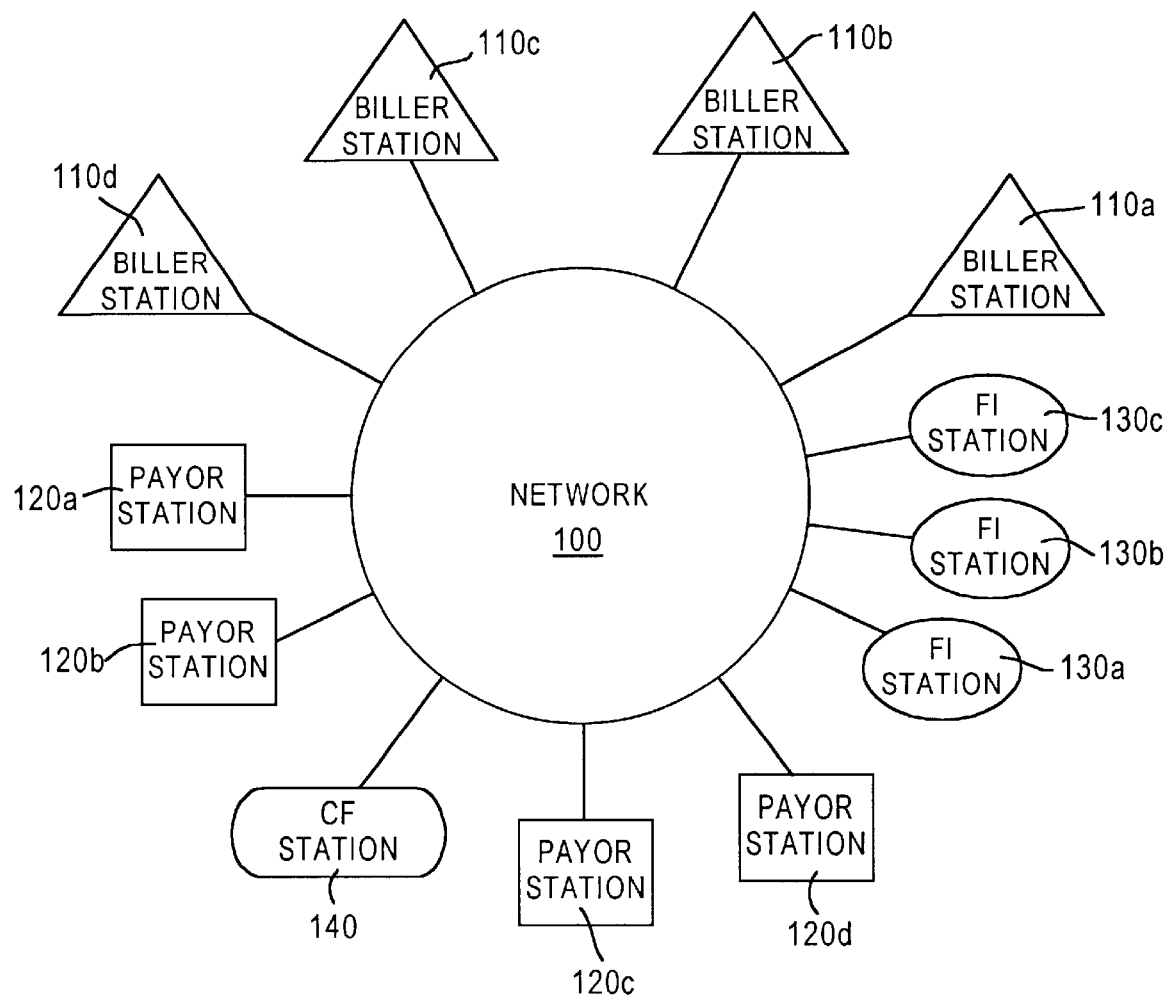
FIG. 1 depicts a bill processing network in accordance with the present invention.

FIG. 1 depicts a communications network 100, which can be a private or public network such as a wide area network (WAN), the Internet or some other type of communication network for linking biller stations 110a–110d, payor stations 120a–120d, financial institution (FI) stations 130a–130c and a centralized CF station 140. The biller stations 110a–110d may represent individual merchants, utility companies, service providers, bank credit card companies, or other individuals or entities to whom a payment is owed. Payor stations 120a–120d may represent individuals or entities which have purchased or ordered goods or services or otherwise have an outstanding debt to the billers represented by stations 110a–110d. The payors represented by stations 120a–120d maintain accounts with one or more of the financial institutions, which may, for example, be banks, credit unions or other type of financial institution or any combination. Each of the billers represented by stations 110a–110d may also maintain one or more deposit accounts in the financial institutions represented by stations 130a–130c. The CF station 140 serves as a centralized bill processing system as will be described in detail below.

Figure 2:
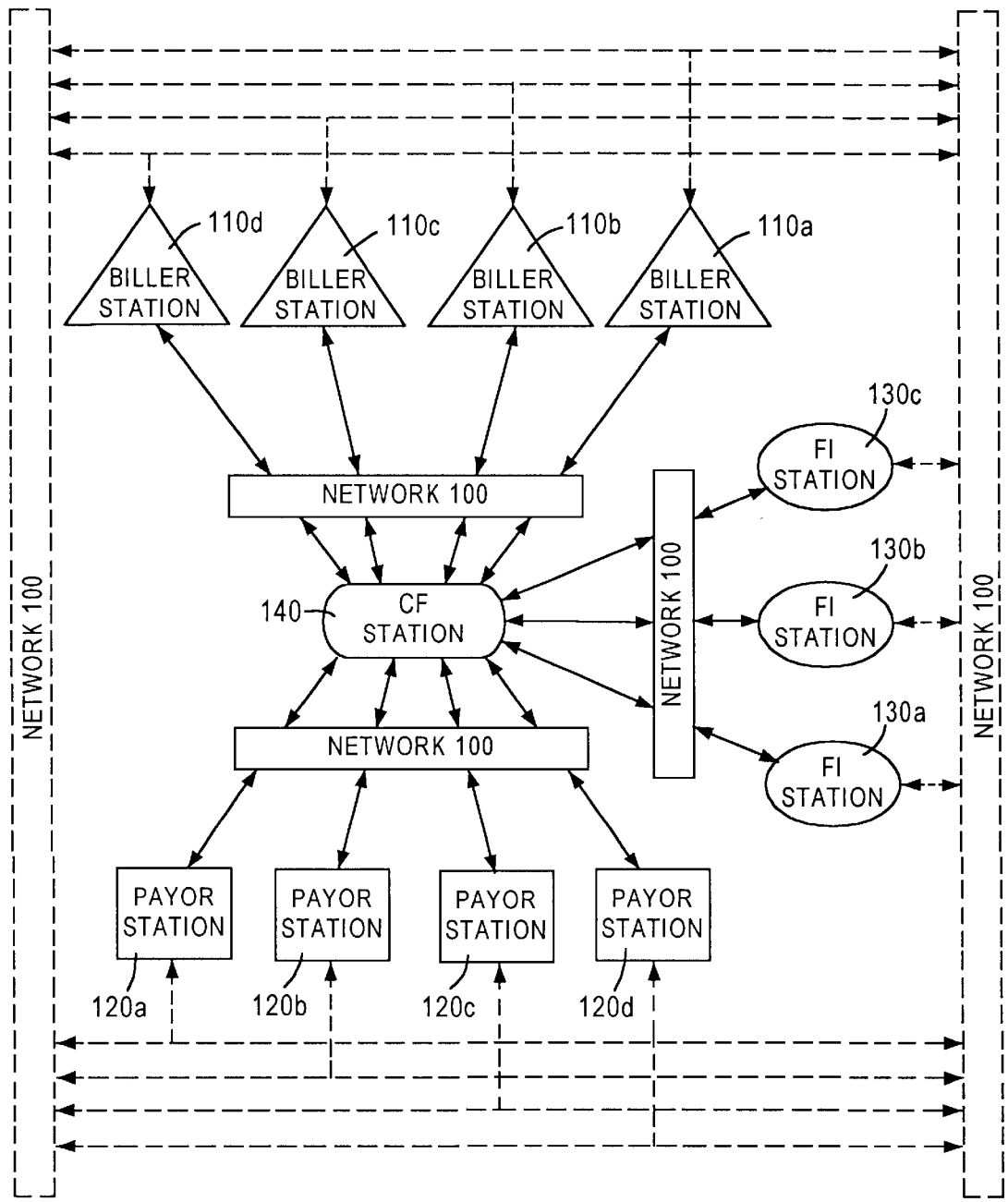
FIG. 2 depicts a functional block diagram of the bill processing network of FIG. 1.

FIG. 2 is a functional block diagram of the bill processing network depicted in FIG. 1. As shown in FIG. 2, the CF station 140 is interconnected, via the network 100, with each of the biller stations 110a–110d and each of the payor stations 120a–120d. Accordingly, each of the billers represented by stations 110a–110d can transmit, via the network 100, billing information to each of the payors represented by stations 120a–120d as appropriate through the CF station 140.

Figure 2A:
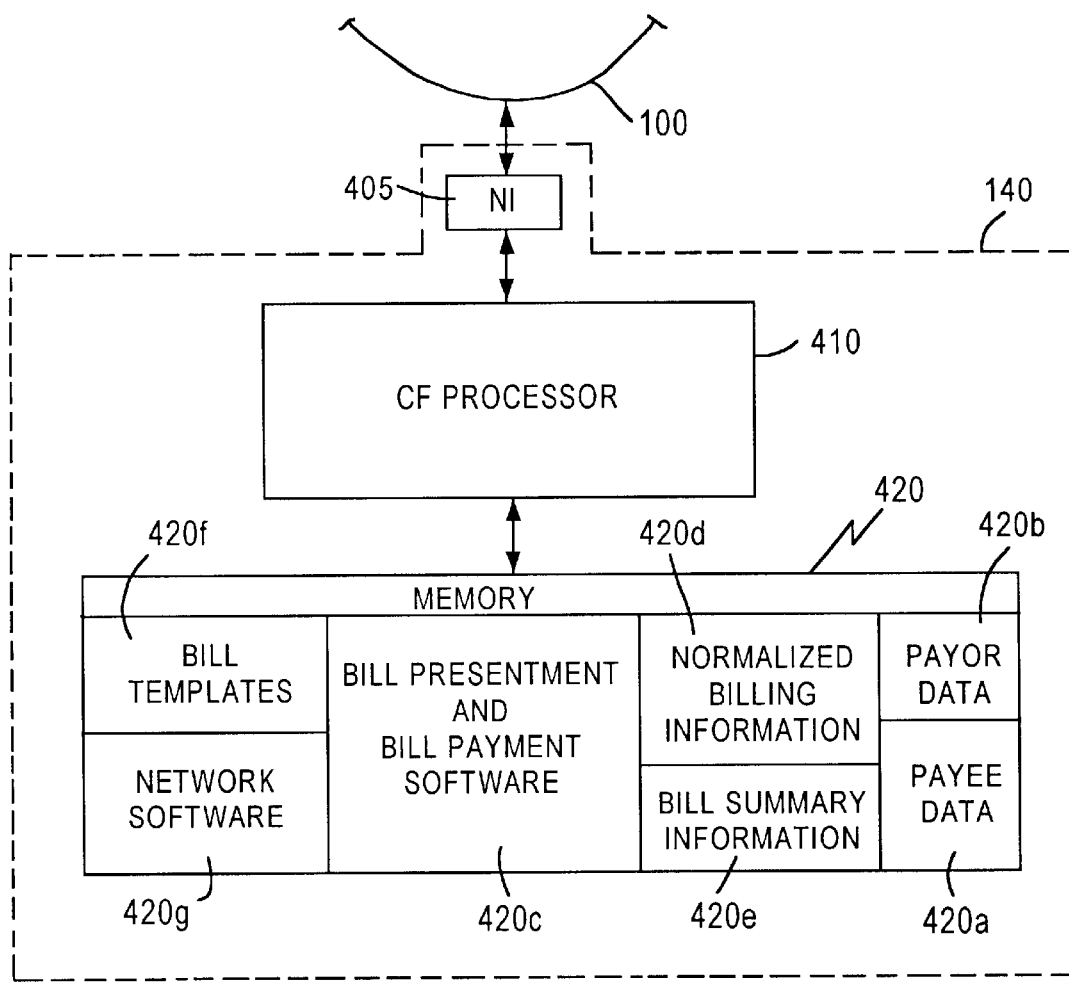
FIG. 2A depicts a simplified block diagram of the CF station of FIG. 1.

As shown in FIG. 2A, the CF station 140 includes a network interface (NI) 405 for receiving and transmitting communications via the network 100. The station 140 also includes a processor 410 and a memory 420. The station 140 could, for example, be a high powered work station, minicomputer, mainframe computer or other type of network computing device which serves as a network server, or any combination of such devices. The memory 420 stores, in area 420a, biller data such as the biller's name, remittance center address, deposit account number with one of the financial institutions represented by stations 130a–130c, account numbers for respective payors represented by stations 120a–120d, network address, e.g. an e-mail address, and other biller related information of each of the billers represented by stations 110a–110d. Payor data is stored in memory area 420b and will typically include such information as the payor's name and address, account numbers with respective billers represented by stations 110a–110d, checking account number with one of the financial institutions 130a–130c, network address, e.g. an e-mail address, and other payor related information.

The billing information received by the CF station 140 from the respective billers represented by stations 110a–110d via the network 100 is normalized by the server processor 410 in accordance with the bill presentment software stored in memory area 420c. Different portions of the normalized bill information are stored in memory area 420d in association with a respective identifier of the appropriate payor represented by station 120a–120d to whom that portion of the billing information relates.

The bill presentment software also generates a summary of the received billing information from each of the billers represented by stations 110a–110d for each of the payors represented by stations 120a–120d and stores the summary information with an identifier of the applicable payor in the memory area 420e. Bill templates are stored in memory area 420f. The bill templates can be merged with the normalized billing information to electronically present the billing information to the appropriate payor represented by station 120a–120d in substantially the same form, including detailed billing information, biller logo, color and terms and conditions, as has historically been provided to the payor in hardcopy. Network software is stored in area 420g of the memory 420.

Once the billing information has been processed by the processor 410 so as to be available for access by the appropriate payors, the processor 410 in accordance with the bill presentment software instructions stored in memory area 420c, generates an e-mail or other message to notify the applicable payors represented by station 120a–120d of the availability of bill presentment information. The processor 410 also generates a signal directing the transmission of the message, via the network interface 405, to the applicable payors using a network address, e.g. an e-mail address, stored as part of the payor data in area 420a of the memory 420.

Figure 3:
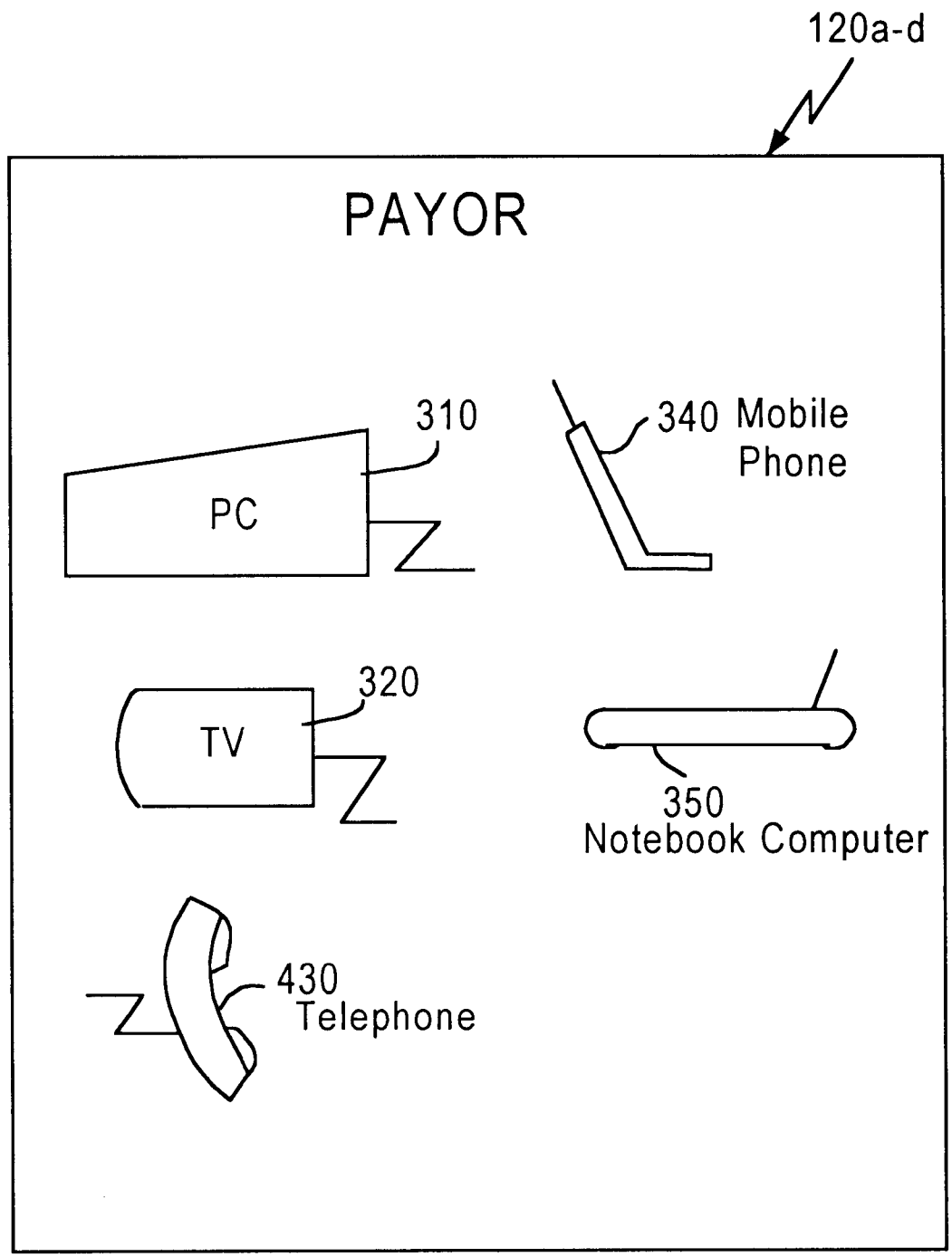
FIG. 3 depicts various types of payor stations which can be utilized in the bill processing network of FIG. 1.

As shown in FIG. 3, the payor 120a–120d may be represented by a personal computer (PC) 310 interconnected to the network 100 by a modem, a television (TV) 320 interconnected to the network 100 via a set top box, a touch tone telephone 330, a mobile phone 340, a notebook computer 350 interconnected to the network 100 by a modem, or some other network device. It will recognized by those skilled in the art that the network device could be of virtually any type capable of receiving a voice, graphic, or textual message. If different types of payor station devices are utilized, the payor data will include an identification of the particular type of network device being utilized by the payor. If audio devices such as telephone 330 or mobile phone 340 are utilized, the processor 410 is configured to include a voice synthesizer to generate voice messages and a voice signal converter to transform received audio messages into digital signals of processing at station 140 in accordance with the bill presentment software instruction stored in memory area 420c.

Figure 2B:
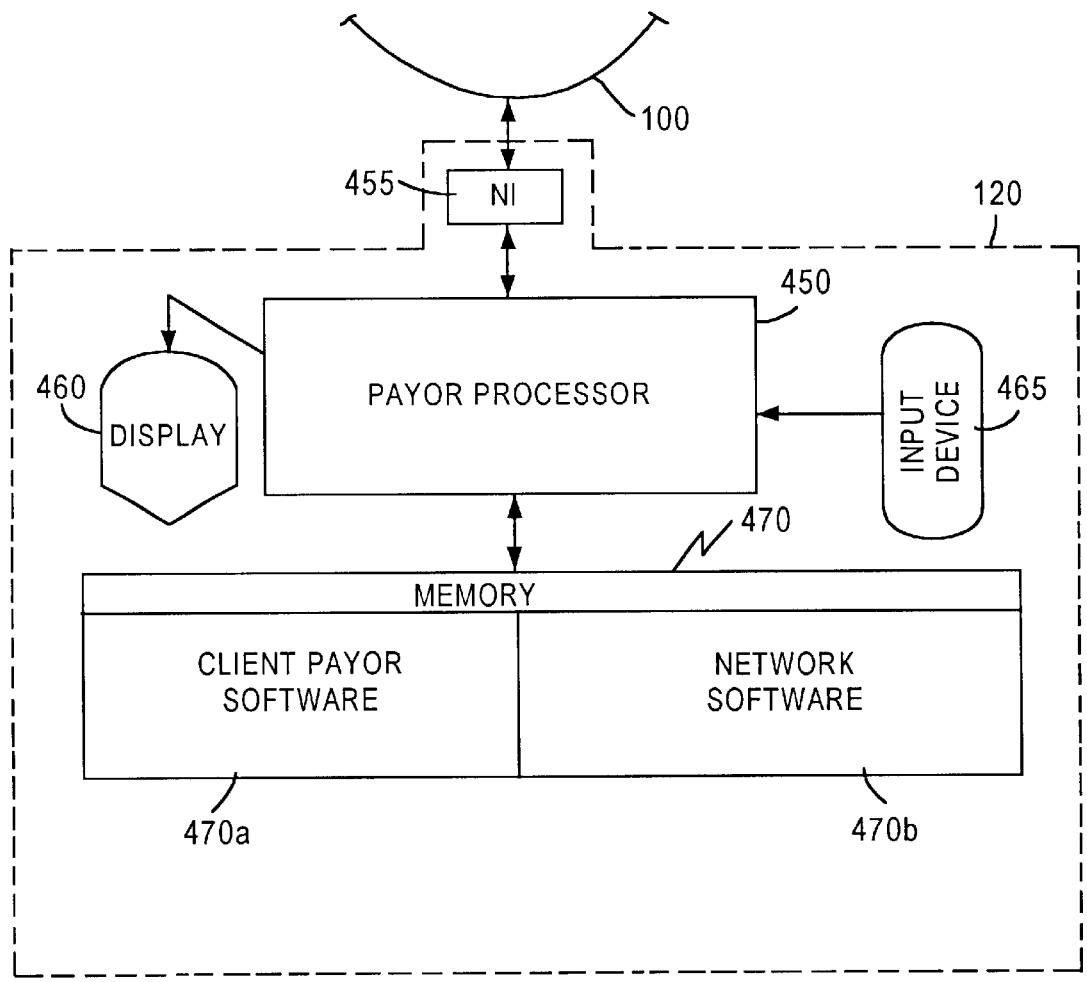
FIG. 2B depicts a simplified block diagram of an exemplary payor station of FIG. 1.

Referring now to FIG. 2B, an exemplary payor station 120 capable of receiving e-mail messages will now be described. Station 120 includes a payor processor 450 which is interconnected to a memory device 470. The memory stores the payor client software in area 470a and the network software in area 470b of the memory 470. It will however be recognized that, if desired, the memory 470 could be eliminated in and that storage of the payor client software could be implemented on the memory 420 of the CF station 140. A network interface (NI) 455 interconnects the payor station 120 to the network 100. Messages transmitted by the CF station 140 to the payor station 120 are received via the network interface 455 and processed by the processor 450 in accordance with the network software stored in area 470b of memory 470.

In a customary e-mail notification processing sequence, the processor 450, in accordance with the network software instructions stored in memory area 470b, directs the presentation of an indicator on the display 460 of the payor station 120 to notify the applicable payor that an e-mail message has been received. Using the input device 465, which may be a keyboard, mouse or other input device, the applicable payor can access the e-mail message and request the available billing related information from the CF station 140.

The notification mechanism may alternatively be implemented directly in the bill presentment client rather than via e-mail. Those of ordinary skill in the art will recognize that there may be many possible implementations of a notification mechanism.

The payor may request the available billing related information by, for example, inputting one or more commands on the input device 465. Responsive to these commands, the processor 450 generates and directs the transmission of the request, via the network interface 455, to the CF station 140. The generated request could, for example, take the form of a reply e-mail message, an instruction to access a web page at the CF station 140 if the network is the Internet or some other instruction as will be well understood by those skilled in the art. If desired, the e-mail message could include an icon or other indicator which can be activated using the input device 465 to automatically link the payor station 120 to the CF station 140 to access bill related information.

Referring again to FIGS. 2 and 2A, the processor 410 of the CF station 140, in response to the request received from the payor station 120a–120d, directs the transmission of the requested bill presentment information, via the network interface 405, to the applicable payor station 120a–120d. The transmitted bill presentment information may need to be generated by the processor 410 responsive to the payor request or may be already stored in the memory 420. For example, the processor 410 may either retrieve the applicable template(s) and normalized billing information from memory areas 420f and 420d and merge this information to generate requested detailed bill presentment information. On the other hand, the processor may simply retrieve information stored in area 420e of memory 420 if only bill summary information is requested. It should be noted that by storing unmerged templates and normalized data and merging this information only responsive to request for detailed information, the required memory to store detailed bill presentment information can be significantly reduced. It should be understood that, in many cases, the payor will required only summary bill presentment information, and thus on-line processing to merge the templates and normalized billing information will not, in many cases, be required. However, preferably, detailed bill presentment information dynamically generated by merging template and normalized data may be cached to support re-retrieval requests responsively.

Referring again to FIG. 2B, the payor station 120a–120d receives, via network interface 455 of payor station 120, the bill presentment information transmitted by the CF station 140 over the network 100. The payor processor 450 processes the received information in accordance with the payor client software stored in memory area 470a and directs the presentation of the received bill presentment information on the display 460 of the payor station 120.

As discussed above referring to FIG. 2, the CF station 140 is linked via the network 100 to various financial institution stations 130a–130c which represent financial institutions with whom checking accounts are maintained by one or more of the payors represented by stations 120a–120d and/or deposit accounts are maintained by one of more of the billers represented by stations 110a–110d. A payor, having received bill presentment information, can now request that payment of one or more bills be made to the appropriate biller(s) represented by station(s) 110a–110d.

In this regard referring again to FIG. 2B, the payor processor 450 generates, in accordance with the client software residing in memory area 470a, a payment instruction and an instruction directing the transmission of the instruction, via the network interface 455, over the network 100 to the CF station 140. Referring again to FIG. 2A, the payment instruction is received and processed by the processor 410 of CF station 140. The processor 410, responsive to the received payment instruction and in accordance with the bill payment software stored in memory area 420c, directs the payment of the applicable bills either by electronic funds transfer or by hardcopy check.

If the payment will be made by electronic funds transfer, the CF processor 410 generates an electronic funds transfer instruction to electronically transfer the appropriate amount from the applicable payor's checking account maintained at one of the financial institutions represented by stations 130a–130c to the appropriate biller's deposit account maintained at one of the financial institutions represented by stations 130a–130c. The processor 410 also generates an instruction to transmit the electronic funds transfer instruction, via the network interface 405, over the network 100 to the applicable payor financial institution station 130a–130c and/or an originating financial institution and or originating financial institution to the Automated Clearing House (ACH) network or similar financial network for funds transfer.

The processor 410 also generates, in accordance with the bill payment software instructions stored in memory area 420c, a message indicating the amount of payment remitted and the associated payor account number, along with an instruction to transmit the message, via the network interface 405, over the network 100 to the appropriate biller station 110a–110d. This remittance advice information may flow directly to the biller station 110a–110d or be routed with the payment through the biller's financial institution 130a–130c, which would deliver the information to the biller station. it should be recognized that the biller station to which the payment notice is transmitted may be different than the biller station from which the billing information is transmitted.

If the payment will be made by hardcopy check, the CF processor 410 generates an instruction to print a hardcopy check for the appropriate amount against funds in CF station 140's checking account. The applicable payor's checking account maintained at one of the financial institutions represented by stations 130a–130c is debited appropriately via ACH (resulting in electronic funds transfer to the CF station account) or via some form of "good funds" debiting through a direct electronic connection to the financial institution (resulting in electronic or wire funds transfer to the CF station account). The check may be a "single check" remitting only a single payor's payment to a particular biller, or a "check and list", combining the remittance from multiple payors to a particular biller. Alternatively, the CF processor may generate an instruction to print a hardcopy check for the appropriate amount against funds in the applicable payor's checking account maintained at one of the financial institutions represented by stations 130a–130c. The processor 410 also generates, in accordance with the bill payment software instructions stored in memory area 420c, a message indicating the amount of the payment(s) remitted and the associated payor account(s). The printed message and check are then mailed to the applicable biller remittance center. It should be recognized that the location to which the payment notice is sent may be different than the location of the biller station from which the billing information is transmitted.

Referring again to FIG. 2, rather than having all operations performed by the CF station 140, certain operations can be performed directly by other network stations and certain information can be transmitted directly between the payor stations 120a–120d, the biller stations 110a–110d and the financial institution stations 130a–130c. It may, in some instances, be preferred to have the CF station 140 linked to the payor stations 120a–120d and biller stations 110a–110d via the financial institution stations 130a–130c.

For example, it may be desirable in some cases for the biller stations 110a–110d to communicate some or all bill related information via the network 100 directly to the payor stations 120a–120d while the notices of the availability are generated and transmitted by the CF station 140 directly to the appropriate payor stations. This facilitates biller control over bill related information which could be stored exclusively on a memory device at the appropriate biller station. In other cases, it may be advantageous for all payment instructions to be transmitted directly from the payor stations 120a–120d to an appropriate financial institution station 130a–130c. In such cases, there could be a preference to have the payment instruction processed by the CF station 140 or at the financial institution station 130a–130c. In still other cases, it may be beneficial for all communications to be transmitted through the financial institution station 130a–130c but all processing to be performed by the CF station 140.

As indicated above, if desired, all or part of the billing information may be retained at the biller stations 110a–110d. For example, it may be desired that detailed bill presentment information be retained at the biller stations 110a–110d while summary bill presentment information be stored and provided by the CF station 140. Although billing information may be maintained by the biller stations 110a–110d, the request for such information may be directed through the CF station 140 to the appropriate biller 110a–110d in order to provide a third party audit trail or meet other desired objectives.

Referring again to FIGS. 2 and 2A, the CF processor 410, in accordance with the bill presentment software stored in area 420c of the memory 420, preferably tracks and stores information relating to requests or transmissions of bill presentation information to payors after the notice of availability. The CF processor 410 also preferably receives, stores and tracks a signal from the payor stations 120a–120d relating to when a notice of availability bills has been viewed by the applicable payor. In this way, the processor 410, in accordance with the bill presentation software instructions, may transmit a reminder notice of the availability of bills, for example, if no request to view the bills has been received for some period of time after the payor has viewed the notice or if bills represented in previously requested bill presentment remain due and unpaid after some period of time. It may be desirable to send reminder notifications one or more times at fixed intervals, e.g., weekly, after the initial viewing of the notice of availability or the initial request for bill presentment information. A reminder notice could alternatively or additionally be sent just prior to the bill due date as a final reminder to the payor before late payment or interest charges will accrue.

Figure 6:
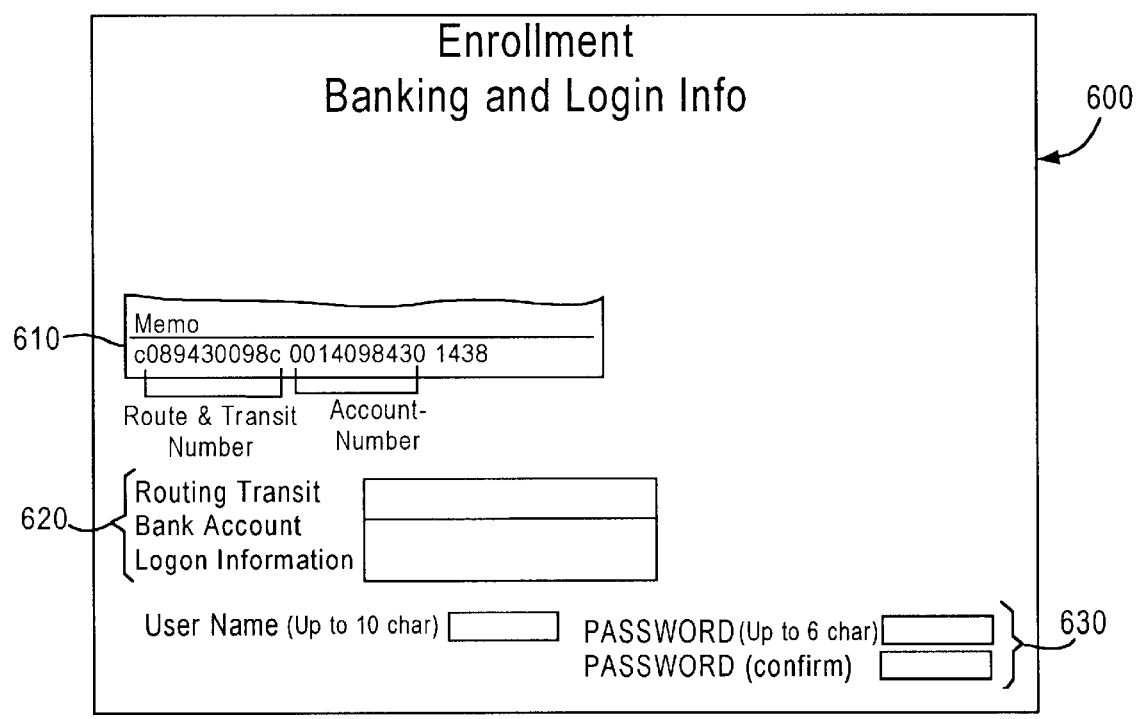
FIG. 6 depicts a still further payor enrollment screen in accordance with the present invention.

Turning now to FIGS. 4–6, the payor enrollment process performed by the CF processor 410, in accordance with the bill presentment and bill payment software instructions stored in memory area 420c, will be described. Upon request by an existing or potential payor represented by a payor station 120a–120d, enrollment interface information is. electronically transmitted via the network 100 from the CF station 140 to the applicable station 120a–120d. The information is provided so as to be capable of processing by the payor processor 450 and presented in one or more screens on a display 460 of the payor station 120. It will of course be recognized that, although the enrollment process is described with reference to a payor station of the type shown in FIG. 2B, the process could be easily implemented with other types of payor stations.

The initial enrollment screen 550, as shown in FIG. 4, includes a listing in block 560 of billers from whom bills can be received electronically. An indicator 565 indicates those billers whose bills can be received electronically and who can also be paid electronically as previously described. The payor using the input device 465 of the payor station 120 can select any or all of the billers identified in the listing in block 560 for electronic bill presentation and/or electronic payment, if applicable. The account number for the payor's account with each selected biller is inserted in block 562 using the payor input device 465. The payor is also given the option, in block 570, of identifying other billers not included in the listing in block 560. Since all billers from whom electronic bills are available are listed in block 560, block 570 is reserved for those billers, for example, the paper boy, babysitter, lawn boy, etc., to whom the payor desires to make payments electronically through the CF station 140 based upon hardcopy bills received directly from the biller.

FIG. 5 depicts further enrollment screen 500 transmitted by the CF station 140 to the payor station 120a–120d during the enrollment process. This screen is also presentable on the display 460 of the payor station 120. This screen facilitates the gathering of payor data which is necessary or desirable for the processing of bills. Using the input device 465 of the payor station 120, the payor enters his/her first name, middle initial, and last name in block 510 of the screen 500. The payor is also requested to enter his/her social security number in block 520 and mother's maiden name in block 525. The maiden name of the payor's mother is requested for subsequent verification purposes. The payor's address is also requested to be entered in block 530. In blocks 540, both home and office telephone numbers are requested.

It should be noted that although the payor's account numbers for those billers selected from the listing in block 560 of FIG. 4 are requested, in certain implementation it may be preferable to obtain the account numbers from the billers as part of the information to be forwarded to the CF station 140 by the applicable billers selected in block 560 of FIG. 4. By eliminating the need for potential payors to provide an account number, the enrollment process can be simplified somewhat from the enrollee's prospective. However, it should be noted that in most cases it will be beneficial to request that the payor enter an account number for each selected biller.

Turning now to FIG. 6, another screen 600, transmitted from the CF station 140 to the payor station 120 during the enrollment process, depicts an exemplary portion of a conventional personal check in block 610. Within this block, the areas of the check having the routing and transit number (RTN) and the account number are indicated. The RTN and account number for the applicable payor's checking account with the applicable financial institution 130a–130c are entered in block 620. Additionally, in block 630, log on information is entered in the form of a user name and password to complete the enrollment process.

Upon enrollment, the billers from whom electronic bills have been requested and the financial institutions from whom checking account withdrawals have been authorized are notified, supplied information is verified and additional information is requested.

Figure 7:
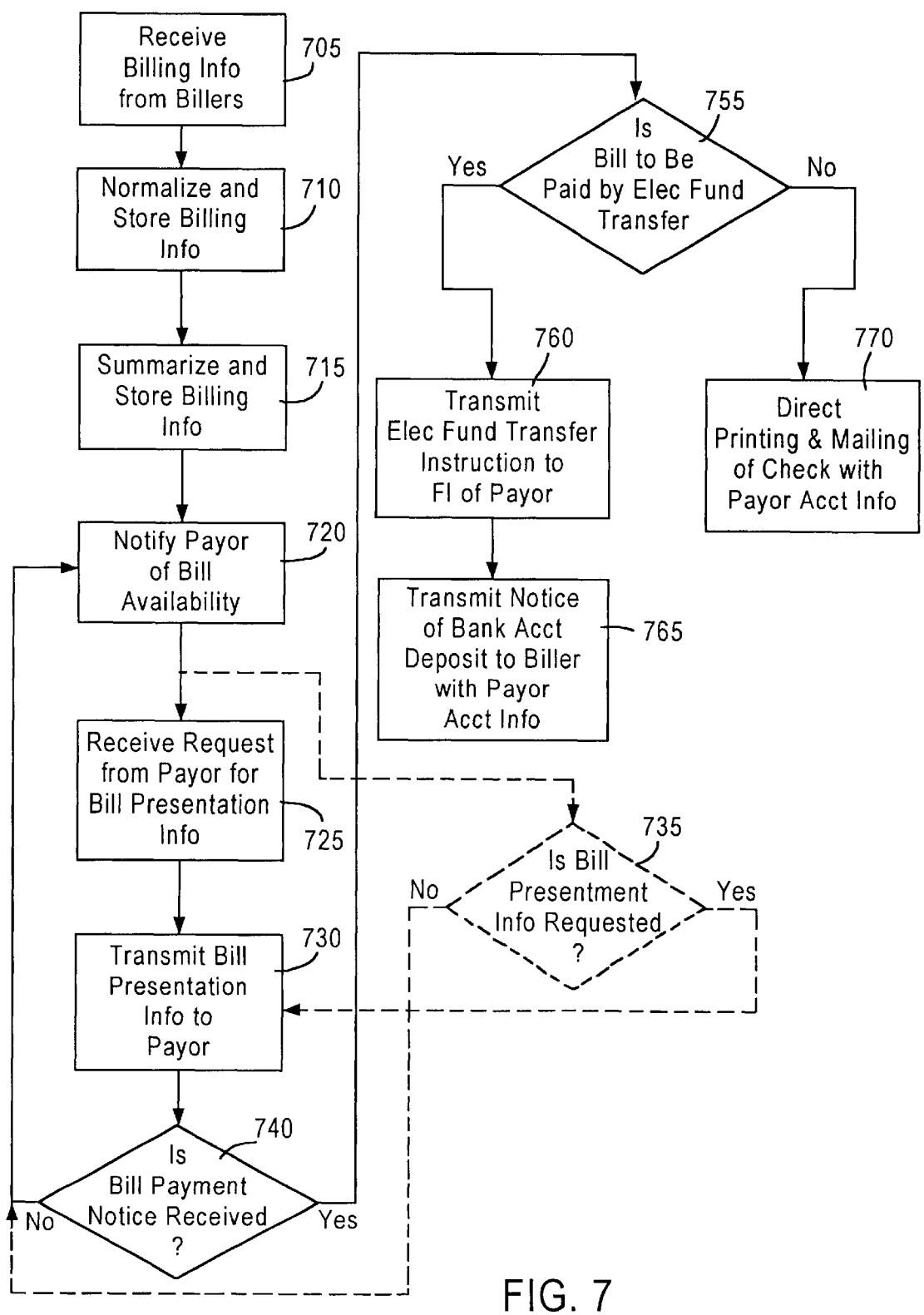
FIG. 7 depicts a simplified flow diagram of the operation of the bill processing network depicted in FIG. 1.

FIG. 7 provides a simplified flow diagram which summarizes operations of the CF station 140 during bill processing. It should be noted that the operations are described with the CF station 140 serving a centralized role within the bill processing network of FIGS. 1 and 2. Those skilled in the art will understand that the described operations could be performed as appropriate by stations other than the CF station 140 within the network shown in FIGS. 1 and 2, as has been previously described above.

As indicated in step 705, the CF station 140 receives billing information from the biller stations 110a–110d via the network 100. The received billing information is normalized, summarized and stored in steps 710 and 715 at the CF station 140. In step 720, the payor is notified of the availability of bills by message transmitted from the CF station 140 to the payor station 120a–120d via network 100. In step 725, the CF station 140 receives a request for bill presentation information from the applicable payor station 120a–120d. The bill presentment information is transmitted over the network 100 by the CF station 140 to the applicable payor station 120a–120d in step 730, responsive to the request. The bill presentment information may include only a summary of bills or one or more detailed bills formed by templating the normalized data before transmission. If desired the transmitted bill presentment information could include both summary and detailed bills.

In step 740, the CF station 140 determines if bill payment instructions have been received for those bills represented by the previously transmitted bill presentation information. This determination may, for example, be made at some predefined period after the receipt of a request for or transmission of the bill presentation information. If not, the payor is again notified of the bill availability in step 720.

Optionally, the payor station 120a–120d may be configured to transmit a notice to the CF station 140, responsive to the viewing of the notice of availability by the applicable payor. In step 735, the CF station 140 determines if a request to receive bill presentment information has been received for those bills represented by the previously transmitted notice of availability. This determination may, for example, be made at some predefined period after the initial viewing of the notice of availability of bill presentation information. If not, the payor is again notified of the bill availability in step 720. If a request has been received, the process continues at step 730.

If the determinations in step 740 is positive, in step 755, the CF station 140 determines if, in accordance with the payment instruction, the bill is to be paid by electronic funds transfer. If yes, CF station 140 transmits, via the network 100, an electronic funds transfer instruction to the payor's deposit account at one of the applicable financial institution represented by stations 130a–130c in step 760. The CF station 140 also transmits, via network 100, a notice to the applicable biller station of the payment in step 765. If payment is to be made by check, the CF station 140 generates a hardcopy check with the appropriate account information and directs the mailing of same to the biller in step 770.

Referring now to FIGS. 8–15, the payor, at his/her own prerogative, can access the bill presentment information at the CF station 140 via the network 100 at any time. For example, this contact may be initiated by using a payor station 120a–120d to contact the CF station 140 at a Web site on the Internet.

Figure 8:
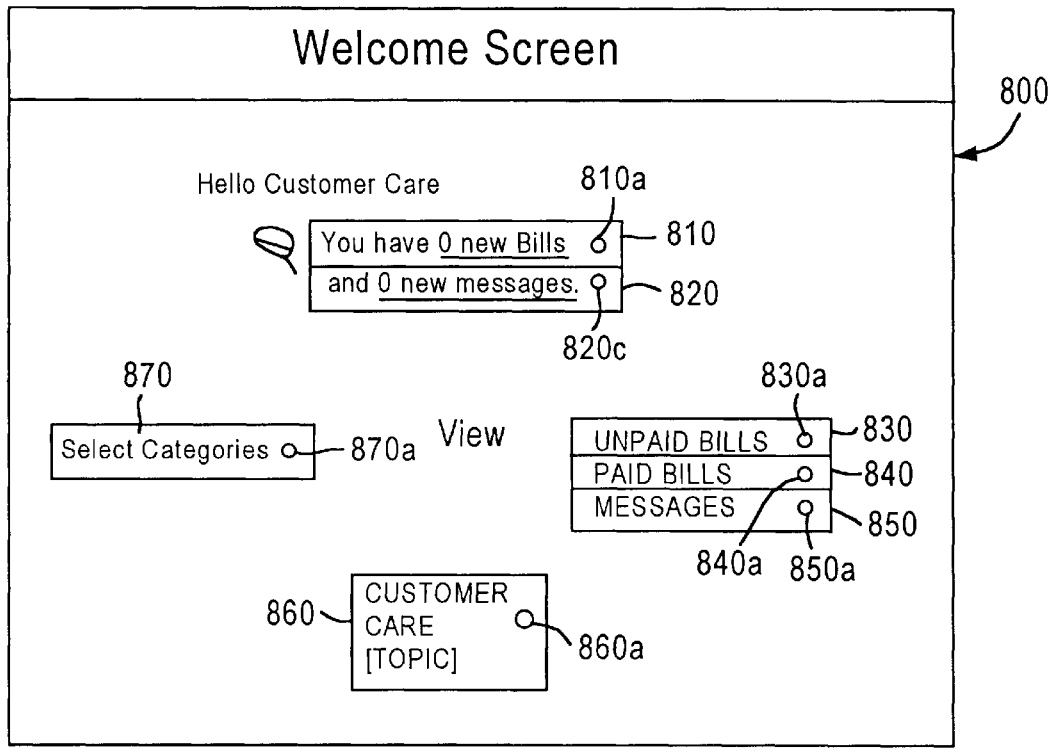
FIG. 8 depicts a payor welcome screen in accordance with the present invention.

Upon initiating contact with the CF station 140, the payor is welcomed, as shown in FIG. 8, by a screen 800 transmitted by the CF station 140 to the payor station 120a–120d for presentment on the payor station display 460. The screen 800 includes notification of bills in block 810 and of messages in block 820 which have not been previously transmitted to the payor. In this particular instance, no new bills or messages are indicated. If new bills and/or messages are available, the payor can, using the payor station input device 465, click on indicator 810a to access the new bills and indicator 820a to access the new messages.

From screen 800, the payor can also access either bill presentment information related to previously transmitted billing information, including information relating to unpaid bills or paid bills, as well as information relating to previously accessed messages by clicking on indicator 830a to receive the unpaid bills, indicator 840a to access bill presentment information related to paid bills, and indicator 850a to access other messages. The payor can also select categories as indicated in block 870 by clicking on indicator 870a. Responsive to clicking on indicator 870a, the CF station 140 will transmit a screen which will be described below and allows the payor to categorize billers in any desired manner.

The payor can also contact customer care by inserting a topic of interest in block 860 and clicking on the indicator 860a. Alternatively, block 860 may offer a pulldown list of selectable topics, similar to block 560 in FIG. 4. In such a scenario, the payor would select one of the topics prior to clicking on indicator 860a. By clicking on the indicator 860a, a message is sent from the payor station 120a–120d to the appropriate customer care station. The customer care station may be the CF station 140 for all topics, or could alternatively be the CF station 140 for certain topics, the appropriate financial institution station 130a–130c for other topics and/or the appropriate biller station 110a–110d for still other topics.

For example, if the inquiry topic relates to the accounting of certain funds transfer from the payor's checking account, the customer care request can be directed to the appropriate financial institution station 130a–130c. If the indicated topic relates to a particular merchant billing, the customer care request can be directed to the appropriate merchant station 110a–110d. If the inquiry is of a more general nature, the customer care request can be directed to the CF station 140.

The customer case messaging option shown in FIG. 8 and described here may be beneficially provided on some or all screens presented on the payor station 120a–120d.

It will be understood by those skilled in the art that, if the CF station 140 serves as a centralized gateway for all communications, all customer care requests could be directed to the CF station 140 and it may be unnecessary for the payor to indicate a topic of interest in block 860. Likewise, if all pertinent information is available at the CF station 140 then all customer care inquiries could also be directed to and disposed of by customer care represented by the CF station 140 rather than being forwarded on to a financial institution station 130a–130c or biller station 110a–110d for response.

Figure 9A:
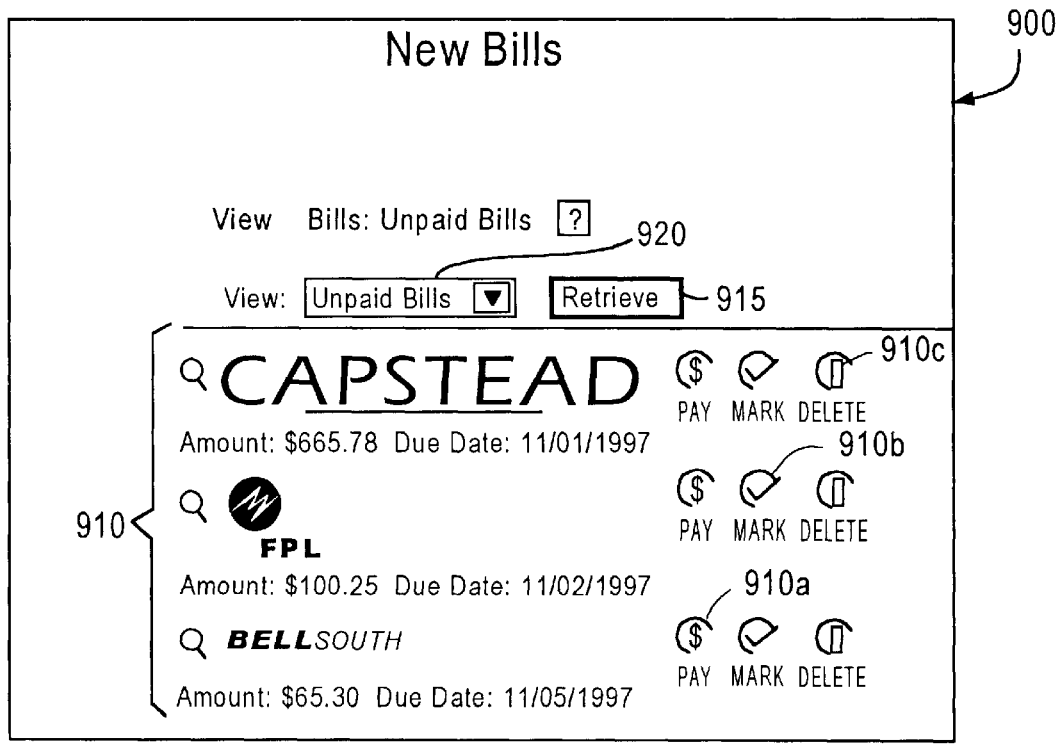
FIG. 9A depicts bill presentment information which includes a new bill summary screen in accordance with the present invention.

Referring now to FIG. 9A, as noted above, if new bills are available, a summary of these bills can be accessed by clicking on indicator 810a. Similarly, if new messages are available, these messages can be accessed by clicking on indicator 820a. By clicking on indicator 810a when new bills are indicated, a screen 900, as shown in FIG. 9A, is transmitted from the CF station 140, via the network 100, to the payor station 120a–120d, processed by payor processor 450 and presented on the payor display 460. The screen 900 includes bill presentment information 910 which summarizes the new bills which have been received since the payor last requested bill presentment information related to unpaid bills. The summary information includes the biller name, amount of the new bill and the due date for payment of the bill.

As indicated in FIG. 9A, the applicable biller logo may be displayed as part of the presentation. The payor is given the option of clicking on a pay indicator 910a, a mark indicator 910b, or a delete indicator 910c, associated with each summarized billing. By clicking on the pay indicator using the payor input device 465, a signal is transmitted to the CF station 140 to direct payment of a particular billed amount on the due date. By clicking on indicator 910c, the displayed bill presentation information relating to a particular biller is deleted. By clicking on indicator 910b, the bill summary information relating to one or more particular bills is marked and by then clicking on indicator 915 the detailed bill presentment information relating to these particular bills can be retrieved from the CF station 140. The payor also has the option, using the payor input device 465, of clicking on block 920 to access a summary of all unpaid bills from the CF station 140. The unpaid bill summary will be substantially in the form of bill summary 910, but will include a summary listing of all unpaid bills rather than just listing new unpaid bills.

Figure 9B:
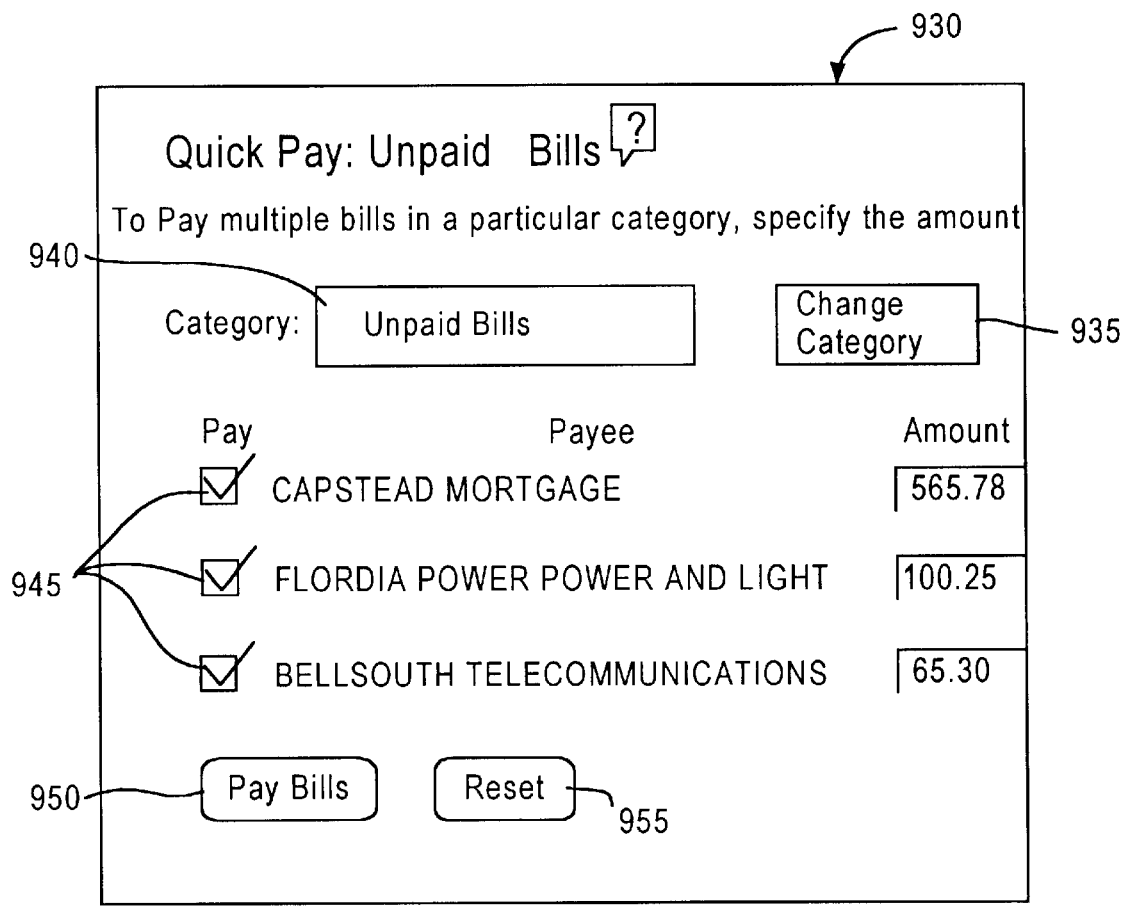
FIG. 9B depicts bill presentment information which includes an unpaid bill summary screen in accordance with the present invention.

FIG. 9B depicts screen 930 which can be transmitted from the CF station 140 to present summary bill related information at the payor station 120a–12d in a categorized manner. As shown, by clicking on indicator 935, categories of billers are changed in block 940. For example, in screen 930 the category has been set to unpaid bills and accordingly, a summary of all unpaid bills appears on the payor display 460. Other categories could be, for example, utility bills, paid bills, questioned bills, credit card bills or any other category which may be desirable under the particular circumstances. In screen 930, one or more of the check blocks 945 can be clicked on along with the pay bill indicator 950 to direct a communication from the payor station 120a–120d to the CF station 140 instructing particular bills which are summarized in screen 930 should be paid on the due date. Indicator 955 allows the check blocks 945 to be reset in the event that a block is inadvertently checked.

Figure 9C:
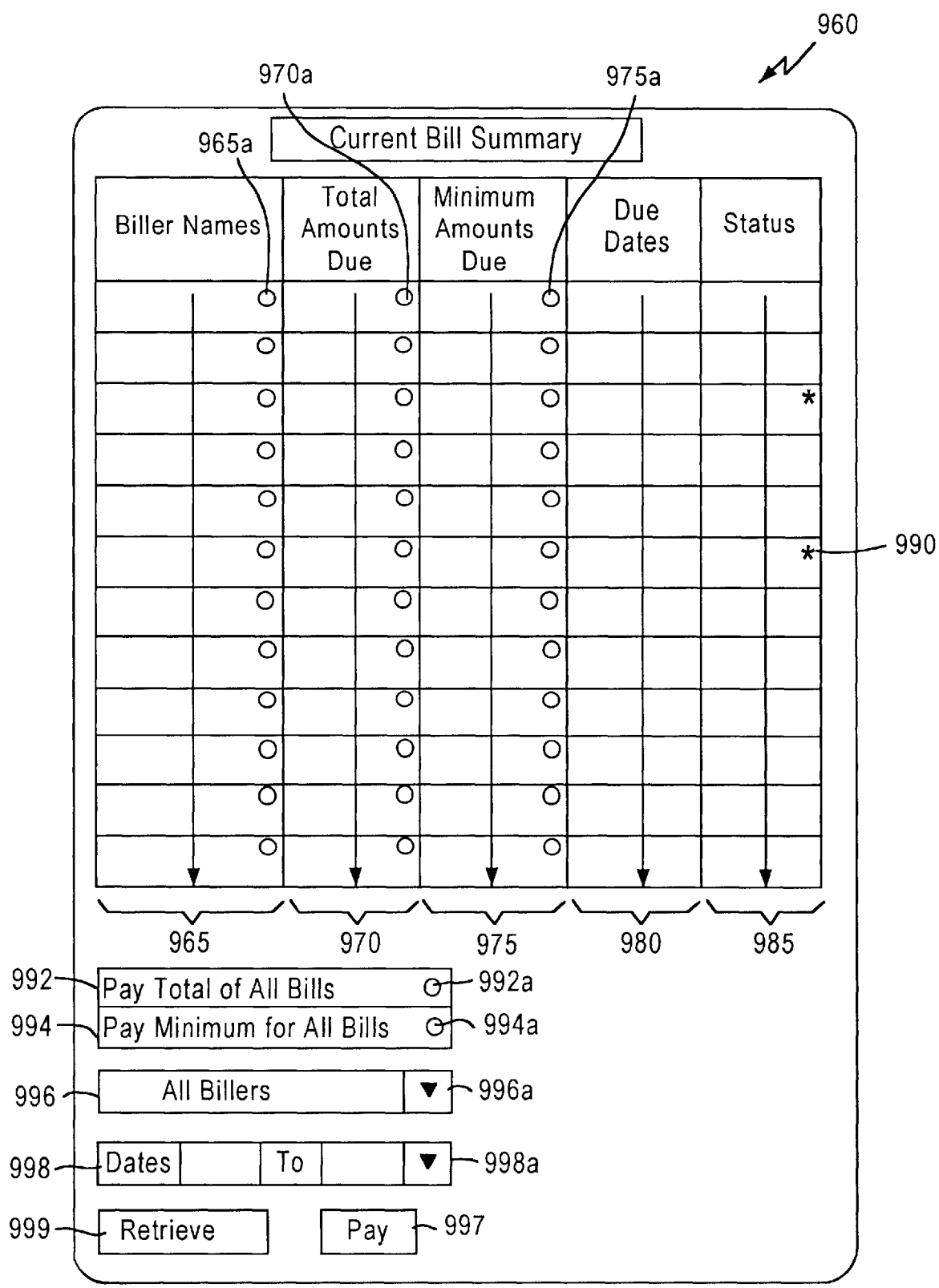
FIG. 9C depicts bill presentment information which includes another type of bill summary in accordance with the present invention.

FIG. 9C depicts still another screen 960 which can be transmitted from the CF station 140 to the appropriate payor station 120a–120d for presentation on the payor display 460. As shown, the listing contains a current bill summary with payee names 965, total bill amounts 970, minimum payment amounts due 975, payment due dates 980 and bill status 985. Indicators 990 indicate that a pre-bill payment authorization has been made with respect to particular bills. Such authorizations will be described below. The status may, for example, be indicated as unpaid, as being processed if payment has been previously directed by the payor, or as on hold if the bill has been previously questioned by the payor.

As indicated in block 992, the payor can direct that all bills summarized in the bill summary of FIG. 9C be paid by clicking on the indicator 992a. Clicking on indicator 992a will result in the payor processor 450 directing a communication to the CF station 140 to pay all of the listed bills by the due date. Alternatively, as indicated in block 994, the payor can click on the indicator 994a to direct payment of the minimum amount due on all listed bills be paid by the payment due date. To the extent that the payment of bills have been preauthorized by the payor, clicking on indicator 992a or 994a will not affect the pre-authorized payments.

Block 996 identifies the category of billers with respect to whom bill related information is summarized in screen 960. An indicator arrow 996a can be clicked on to scroll through various categories of billers to change the information summarized on screen 960, as has been previously described with reference to FIG. 9B. Additionally, dates can be inserted in block 998 to limit or extend the amount of bill summary information which is displayed. The arrow indicator 998a can be used to change the "TO" date.

By clicking on one or more indicators 965a and the retrieve indicator 999, detailed bill presentment information relating to particular bill summary items can be accessed from the CF station. By clicking on one or more of the indicators 970a and the pay indicator 997, an instruction to pay the total billed amount associated with particular bills will be communicated to the CF station 140. By clicking on one or more of the indicators 975a and the pay indicator 997, an instruction will issue to the CF station 140 to make payment of the minimum amount due on particular bills.

Figure 10A:
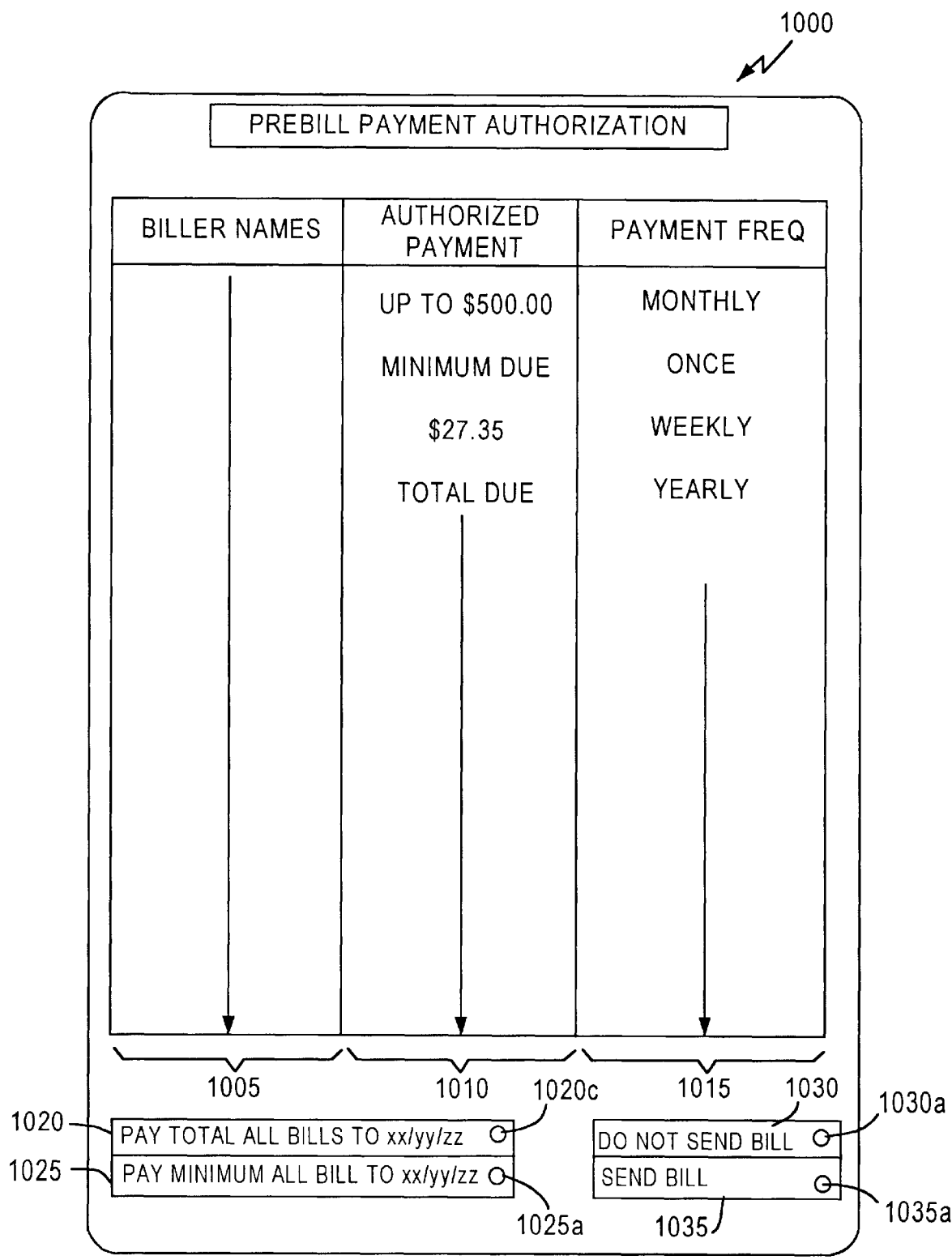
FIG. 10A depicts a pre-bill payment authorization screen in accordance with the present invention.

Turning now to FIG. 10A, a pre-bill payment authorization screen 1000 is shown. The screen is transmitted from the CF station 140 to the appropriate payor station 120a–120d for presentation Dn the payor station display 460. The pre-bill payment authorization screen 1000 allows the payor to identify billers in column 1005 whose bills are pre-authorized by the payor for payment by the CF station 140. More particularly, the payor can designate in column 1010 a fixed payment amount, a maximum payment amount or an instruction to pay the total amount due or mininum amount due for any named biller. Further, the payor can specify, it so desired, in column 1015, a frequency at which such payments are authorized.

As shown in FIG. 10A, the payor can also authorize payment of the total amount billed for all billers identified by an asterisk 415 in FIG. 4 by filling in a period of authorization in block 1020 and clicking on indicator 1020a. Similarly, if the payor wishes to pre-authorize payments of the minimum amount due on all bills, the period of authorization can be inserted in block 1025 and indicator 1025a can be clicked on. As indicated by block 1030, an indicator 1030a can be clicked on to direct that notification of and bill presentment information associated with bills for which payment is pre-authorized not be forwarded to the payor. The payor also has the option, as indicated by block 1035, of clicking on indicator 1035a to receive notices and presentations of bill presentment information associated with the bills which have been pre-authorized for payment by the CF station 140.

Figure 10B:
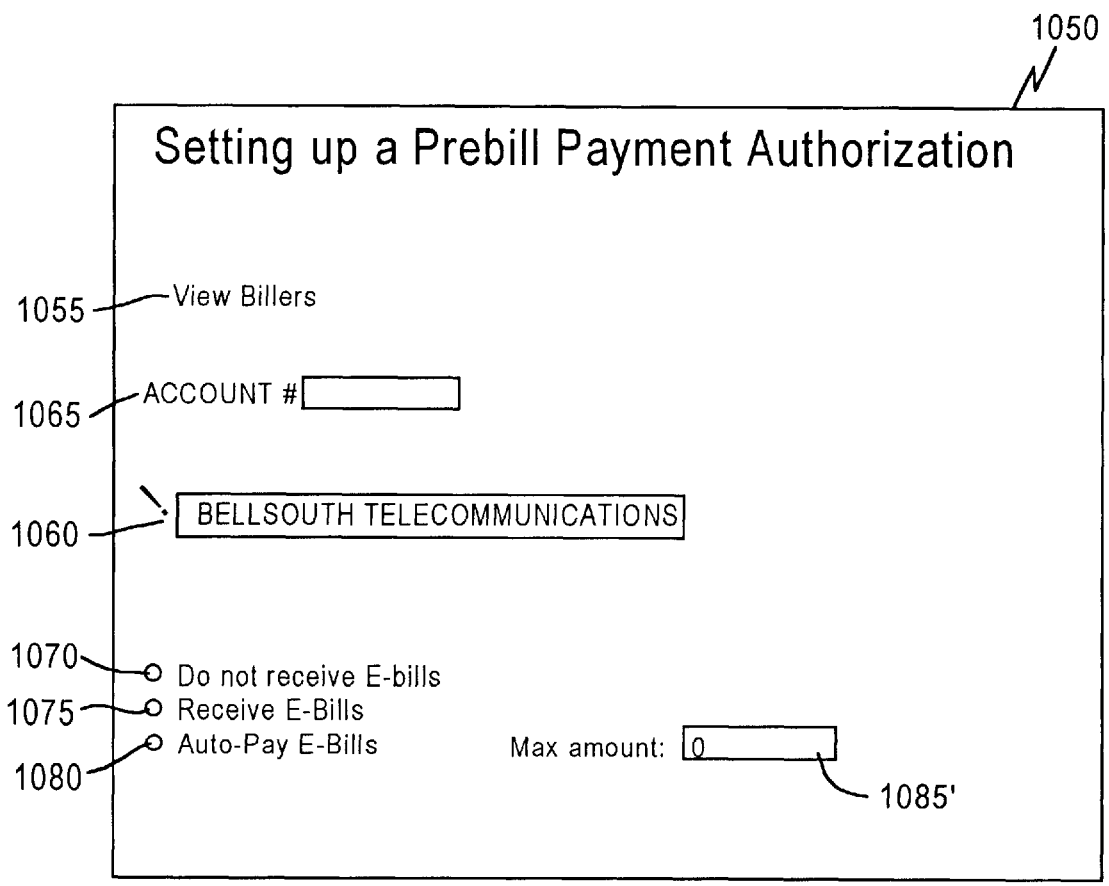
FIG. 10B depicts another pre-bill payment authorization screen in accordance with the present invention.

Figure 10B depicts an alternative screen 1050 which may be utilized in setting up pre-bill payment authorization. Screen 1050 is transmitted from the CF station 140 to the applicable payor station 120a–120d. Billers identified in block 1060 and associated account numbers identified in block 1065 can be changed by clicking on indicator 1055. Alternatively, the payor can enter a biller name in block 1060 and the payor's account number with the particular biller payments will appear automatically in block 1065. By clicking on indicator 1070, the payor can direct the CF station 140 not to transmit notices and presentations of bill presentment information relating to the particular biller indicated. By clicking designator 1075, the payor can direct the CF station 140 to continue to transmit notices and bill presentment information regarding unpaid bills of the identified biller. By clicking on indicator 1080 after entering an amount in block 1085, the payor can pre-authorize the CF station 140 to pay bills of the indicated biller up to the maximum amount indicated without further authorization.

As indicated above, the payor station 120a–120d can also access the detailed bill related information stored at the CF station 140. As shown in FIG. 11, detailed bill presentment information, identified with referenced numeral 1110, is transmitted as screen 1100 by the CF station 140 responsive to a request for such information from the payor station 120a–120d. By clicking on indicator 1120, the payor station 120a–120d will issue an instruction directing the payment of the bill through the CF station 140. The bill can also be deleted from the screen by clicking on indicator 1125.

Figure 12A:
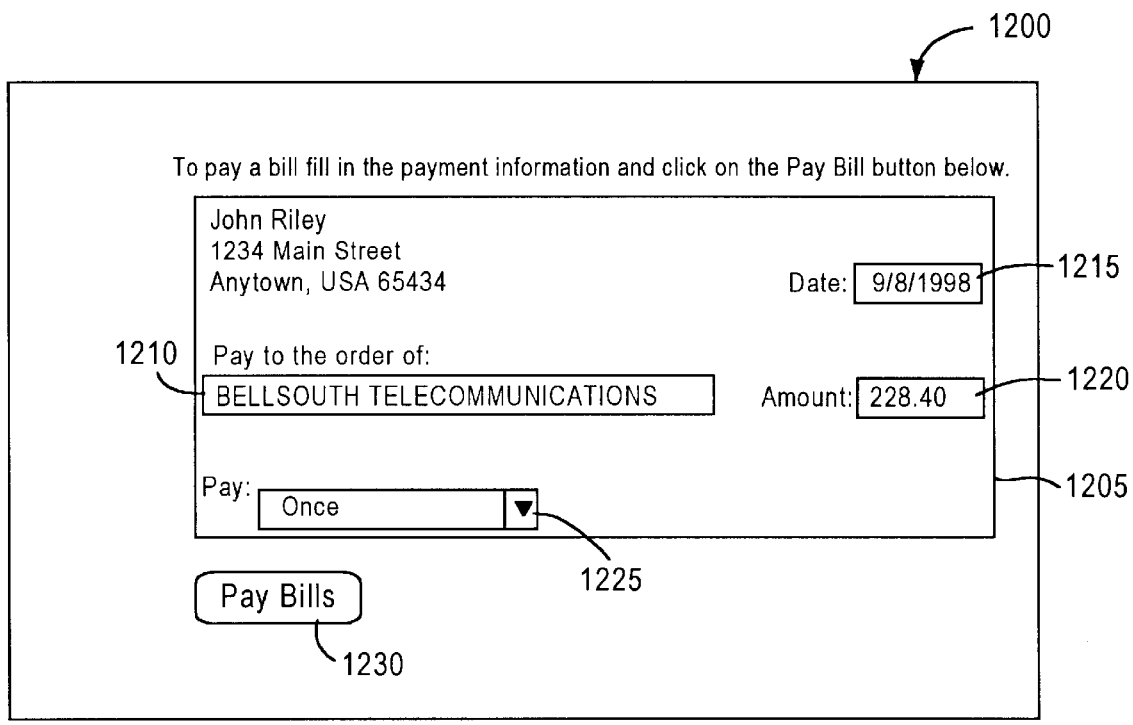
FIG. 12A depicts a bill payment authorization screen in accordance with the present invention.

Responsive to clicking on indicator 1120 at payor station 120a–120d, a screen 1200, as shown in FIG. 12a, is transmitted by the CF station 140. The screen 1200 includes a check 1205 which can be presented by the payor processsor 450 on the display 460 at the payor station 120a–120d. The check 1205, as shown, resembles a conventional hardcopy personal check. The name of the applicable biller automatically appears in the block 1210. An appropriate payment date automatically appears in block 1215. It should be noted that the indicated payment date may pre-date the payment due date included on the bill presentment information of FIG. 11 to reflect when the payment must be made to ensure timely arrival and avoidance of late charges. The lead time may vary depending on the remittance method (hardcopy check or various forms of electronic funds transfer). The total bill amount is also automatically indicated in block 1220.

The payor can modify the date and amount of the payment if so desired. As an option, the payor can also indicate in block 1225 that the amount shown should be paid to the biller more than once, for example, monthly or semi-annually. This feature will typically be most useful where a fixed payment amount is payable on a fixed periodic basis to the applicable biller. The payor then clicks on the pay bill indicator 1230 to direct transmission of an instruction from the payor station 120a–120d to the CF station to make payment to the designated payee, i.e., biller, in the designated amount on the designated date.

Figure 12B:
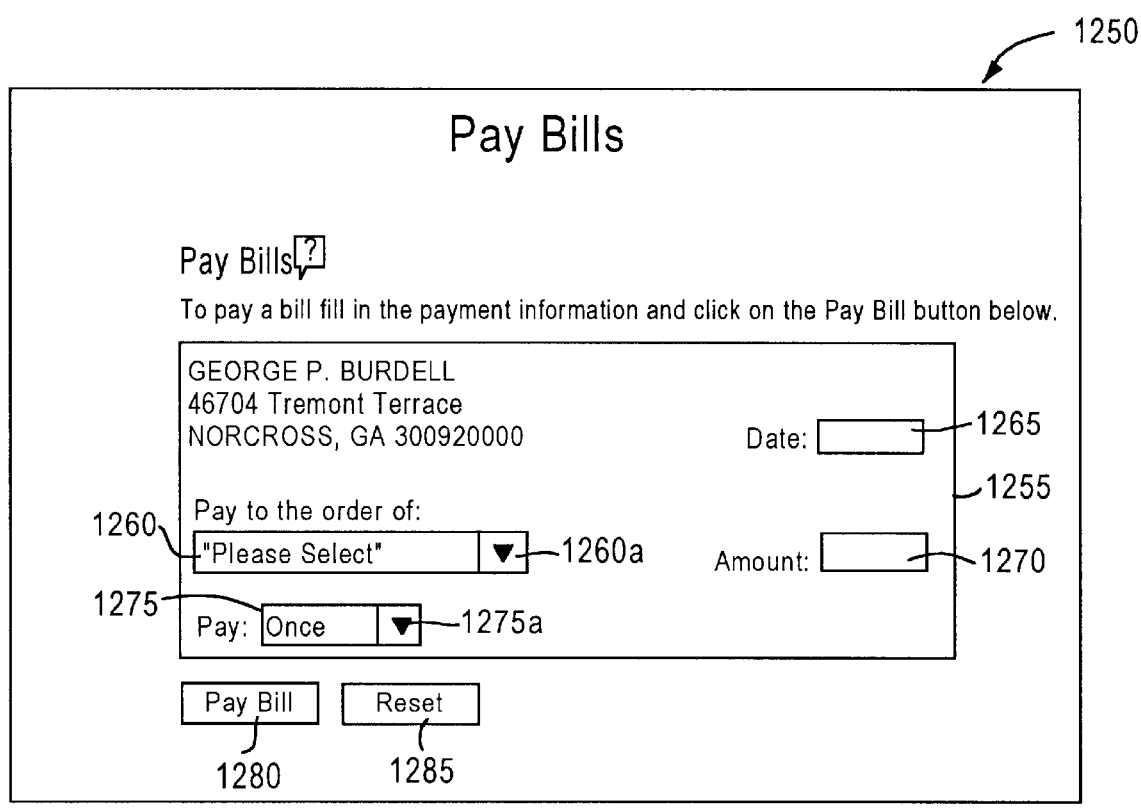
FIG. 12B depicts a different bill payment authorization screen in accordance with the present invention.

FIG. 12B depicts an alternative bill payment screen 1250. Screen 1250 includes a check 1255 which is similar to check 1205 of FIG. 12A, but which can be used in connection with the payment of individual bills from a bill summary screen such as those previously described with reference to FIGS. 9A–9A. More particularly, responsive to the pay indicator, in the bill summaries shown in FIGS. 9A–9C, being clicked on at the payor station 120a–120d, the CF station 140 transmits screen 1250 to the payee station. The check 1255 includes block 1260 in which an individual biller's name can be inserted by scrolling through billers names appearing on the bill summary using the arrow indicator 1260a. The bill due date or a date which allows time for hardcopy mailing of a check to the biller automatically appears in the date block 1265 for the listed bill of the selected biller.

Figure 12C:
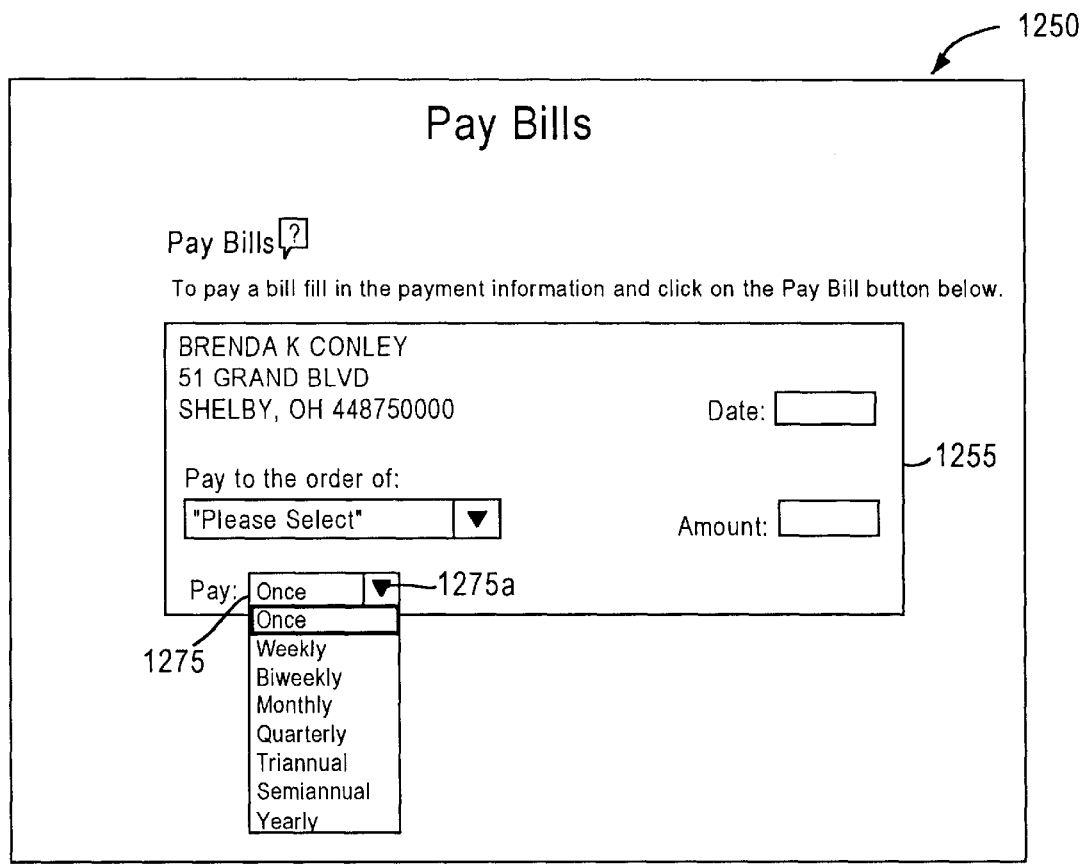
FIG. 12C details certain aspects of the bill payment authorization screen of FIG. 12B.

In the screen 1250, the block 1270 must be filled in by the payor to indicate the desired payment amount. Block 1275 can be scrolled by clicking on the arrow indicator 1275a to select the period of payment as has been previously discussed with reference to block 1225 in FIG. 12A. FIG. 12C further details screen 1250 to show that block 1275 can be expanded to provide multiple options with respect to the payment period for selection by the payor.

Once the check 1255 has been appropriately filled out the payor can then click on the pay bill indicator 1280 to transmit an instruction from the payor station 120a–120d directing the CF station 140 to pay the selected biller in accordance with information contained in the filled check 1255. If, on the other hand, changes in the check information are required, the payor can click on indicator 1285 to reset check 1255 and restart the process of selecting a biller for payment and filling in the amount of the payment to be made.

Referring to FIG. 13, a screen 1300, having a payment list 1305 including those bills which have been paid or on which instructions for payment have been received, is generated by the CF station 140. Responsive to a request from the payor, the screen 1300 is transmitted via the network 100 to the appropriate payor station 120a–120d. The screen 1300 is presentable on the payor display 460. The screen includes a listing of billers in column 1310 and a listing of the date on which payment has or will be made in column 1315. The amount of the authorized payment is listed in column 1320 along with the period at which such payment is authorized in column 1325. A payment confirmation number is referenced in column 1330. This number can be used to identify the particular transmission or payment of interest should the payor wish to make any inquiries to customer care regarding the payment. In column 1335, the status of the payment is indicated. For example, as indicated, the status may be that payment has been processed or may be pending awaiting a due date of payment. In column 1340, the payor is provided with various options depending upon the status of the payment. For example, where payment is pending, the payment authorization can be stopped or edited. In those cases where payment has been made, the payor can make inquiries relating to those payments.

Figure 14:
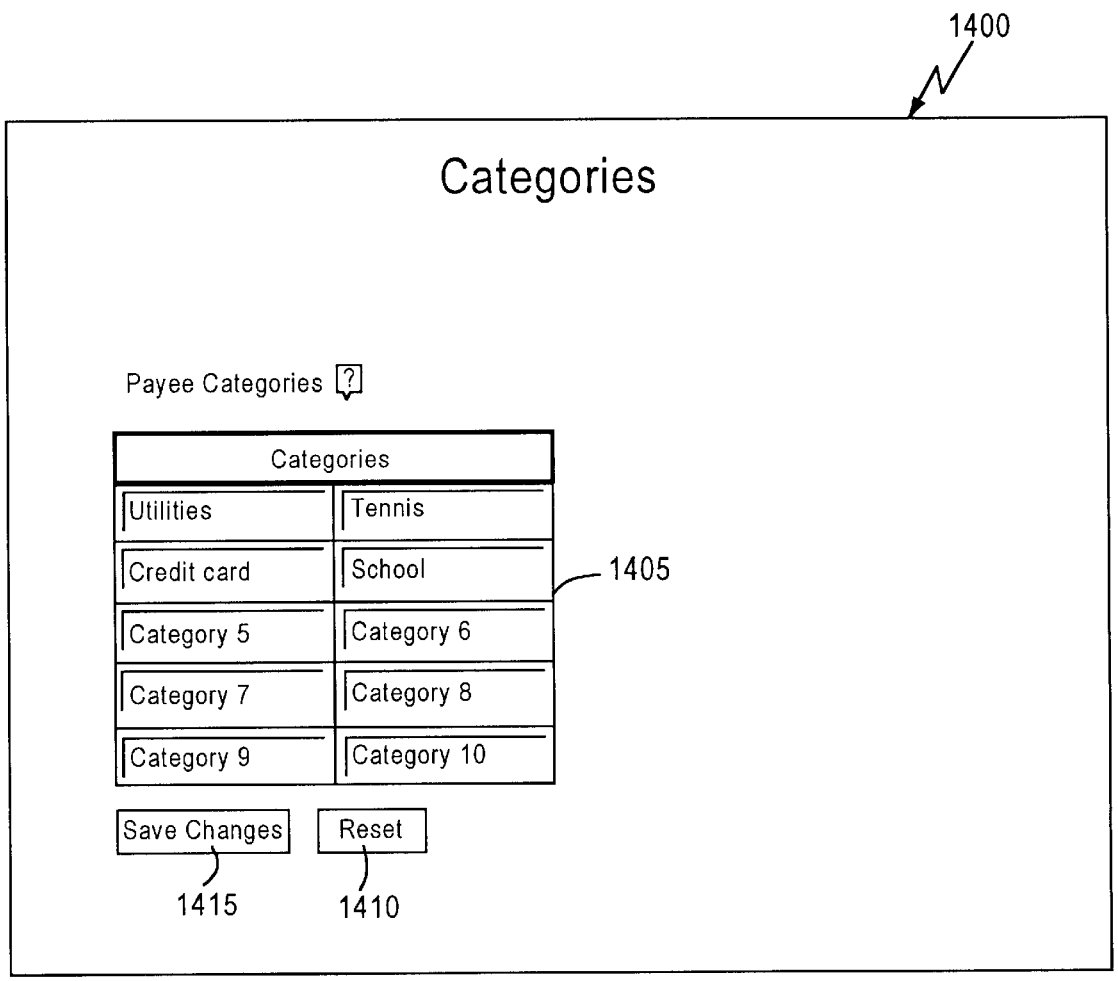
FIG. 14 depicts a biller category screen in accordance with the present invention.

FIG. 14 depicts a screen 1400 which, responsive to a request from a payor, is transmitted by the CF processor 140 to the payor station 120*a*–120*d*. Screen 1400 allows the payor to establish certain categories of billers, as has been previously discussed. For example, the biller may, in block 1405, establish categories for utilities, credit card companies, school, tennis related activities and any other categories as may be desired by an individual payor. By clicking on the reset indicator 1410, the payor can modify the listed categories. The selected categories and any changes to the category listings are saved by clicking on indicator 1415.

Figure 15:
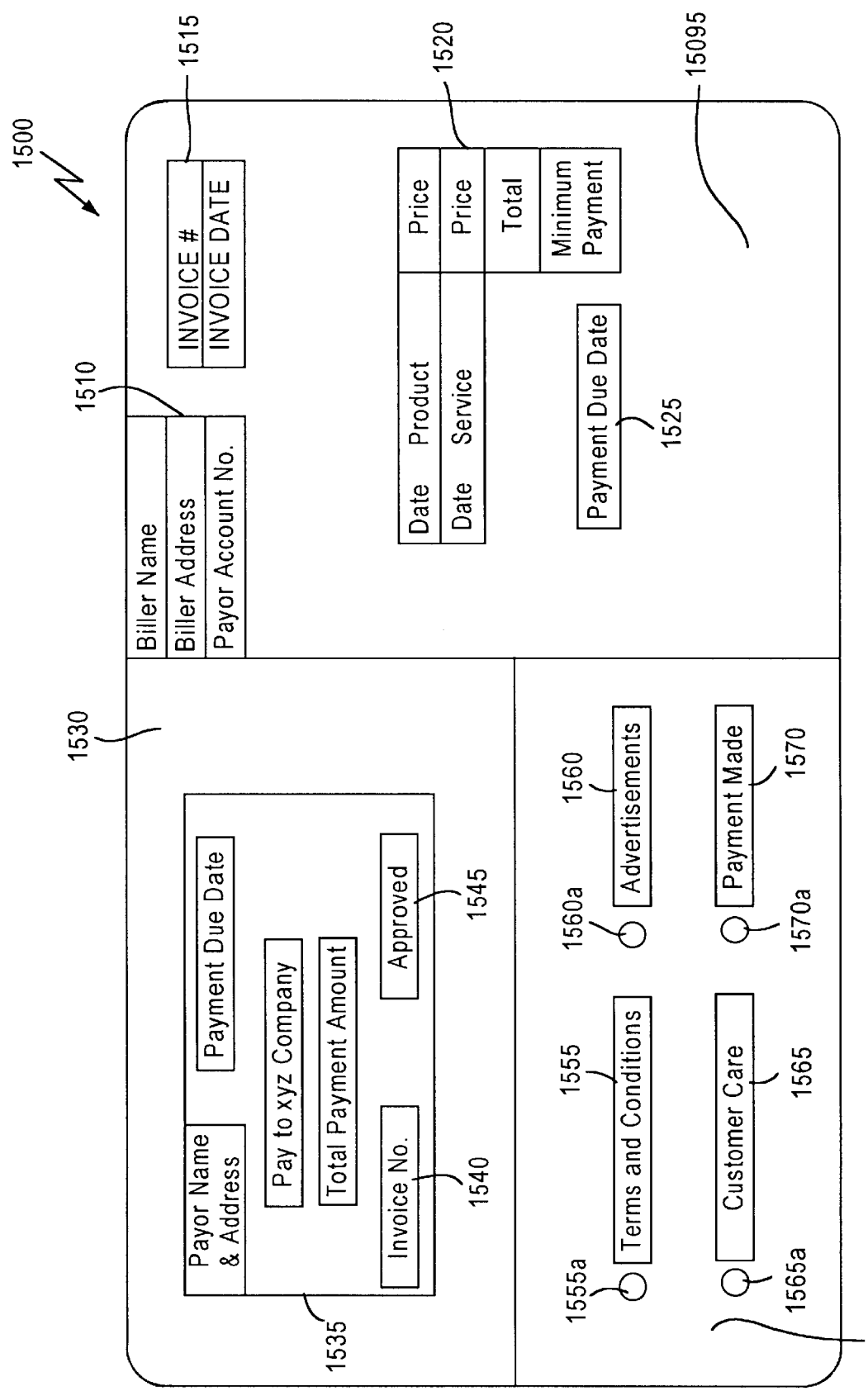
FIG. 15 depicts a screen having bill presentment and payment authorization information in accordance with the present invention.

FIG. 15 depicts a particularly beneficial screen 1500 for bill presentment and payment. As shown, the CF processor 140 transmits for presentation on the payor station display 460, a screen having an area 1505, which includes biller-specific bill presentment information, including the biller name, biller address and payor account number with the biller in block 1510. The area 1505 also includes a block 1515 having the biller invoice number and invoice date to the extent applicable. A block 1520 presents information which includes the purchase dates, product/service descriptions and the associated billed amounts, along with the total amount due and minimum payment due. A block 1525 indicates the payment due date.

In section 1530 of screen 1500, a check 1535 is shown which includes information similar to that of check 1205 which is described above with reference to FIG. 12A, with the exception that the check 1535 includes an invoice number in block 1540 and a click on indicator for approving the payment in block 1545. As in FIG. 12A, the payment due date and the total payment amount can be modified. An area 1550 of the screen 1500, has indicators which can be clicked on to access other information. As shown, indicator 1555*a* can be clicked on to access other terms and conditions as indicated in block 1555, and indicator 1560*a* can be clicked on to access advertisements which the biller wishes to include with the bill presentment as indicated in block 1560.

An indicator 1565*a* can be clicked on to access customer care as indicated in block 1565. The customer care access can, if desired, be similar to that described with reference to FIG. 8. Any customer care inquiry will automatically reference the particular account number referred to in area 1505 of the screen 1500, and may also reference the invoice number referred to in area 1505. By clicking on indicator 1570*a*, the payor can determine if payment has already been made as indicated by block 1570. If payment has been made, by clicking on indicator 1570*a* a canceled check stamp will appear on the check 1535 to indicate that the check has been cashed.

Accordingly, utilizing the screen 1500, a payor can access all information on a single screen necessary to review detailed bill presentment information relating to any particular bill, make payment of that bill in a desired amount and access other information, such as terms and conditions and advertisements, which would normally be included in a hardcopy mailing of bill. The payor can also determine that payment of the bill has in fact been received by the applicable biller. Should the biller have questions regarding the bill or payment, by simply clicking on indicator 1565*a*, customer care can be accessed.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, those skilled in the art will recognize that its usefulness is not limited thereto and that the present invention can be beneficially utilized in any number of environments and implementations. Accordingly, the claims set forth below should be construed in view of the full breath and spirit of the invention as disclosed herein.

What is claimed is:

1. A method of electronically presenting billing information, comprising the steps of:

receiving first billing information associated with a plurality of different first billers, a first portion of the first billing information representing bills for a first payor and a second portion of the first billing information representing bills for a second payor;

receiving a first request from the first payor for current billing information representing bills for the first payor and a second request from the second payor for current billing information representing bills for the second payor;

transmitting first bill presentment information corresponding to the first portion of the first billing information to the first payor responsive to the first request and second bill presentment information corresponding to the second portion of the first billing information to the second payor responsive to the second request;

receiving, subsequent to the receipt of the first billing information, second billing information associated with a plurality of different second billers, a first portion of the second billing information representing bills for the first payor and a second portion of the second billing information representing bills for the second payor;

receiving a third request from the first payor for then current billing information;

transmitting third bill presentment information corresponding to the first portion of the first billing information and the first portion of the second billing information to the first payor responsive to the third request;

receiving notice of payment of the bills represented by the second portion of the first billing information;

receiving, subsequent to receipt of the notice of payment, a fourth request from the second payor for then current billing information; and transmitting fourth bill presentment information corresponding to the second portion of the second billing information to the second payor, without transmitting the second bill presentment information, responsive to the fourth request.

2. A method of electronically presenting billing information, comprising the steps of:

receiving billing information associated with a plurality of different billers, a first portion of the billing information representing bills for a first payor and a second portion of the billing information representing bills for a second payor;

receiving a first request from the first payor for current billing information representing bills for the first payor and a second request from the second payor for current billing information representing bills for the second payor; and transmitting first bill presentment information corresponding to the first portion of the billing information to the first payor responsive to the first request and second bill presentment information corresponding to the second portion of the billing information to the second payor responsive to the second request;

wherein the transmitted first bill presentment information includes a listing, displayable as a single page, of respective billed amounts paid by the first payor to each of more than one of the plurality of the different billers; and wherein the transmitted second bill presentment information includes a listing, displayable as single page, of respective billed amounts paid by the second payor to each of more than one of the plurality of the different billers.

3. A method of electronically presenting billing information, comprising the steps of:

receiving first billing information associated with a plurality of different first billers, a first portion of the first billing information representing bills for a first payor and a second portion of the first billing information representing bills for a second payor;

receiving a first request from the first payor for current billing information representing bills for the first payor and a second request from the second payor for current billing information representing bills for the second payor;

transmitting first bill presentment information corresponding to the first portion of the first billing information to the first payor responsive to the first request and second bill presentment information corresponding to the second portion of the first billing information to the second payor responsive to the second request;

receiving, subsequent to the receipt of the first billing information, second billing information associated with a plurality of different second billers, a first portion of the second billing information representing bills for the first payor;

transmitting, prior to the receipt of the second billing information, a first notice to the first payor of the availability of the first bill presentment information;

transmitting, subsequent to transmission of the first bill presentment information and the receipt of the second billing information, a second notice of the availability of the first bill presentment information and second bill presentment information corresponding to the second billing information;

receiving a third request from the first payor for then current billing information; and transmitting the first and the second bill presentment information to the first payor responsive to the third request.

4. electronic bill presentment system, comprising:

a memory configured to store billing information associated with a plurality of different billers, a first portion of the billing information representing bills for a first payor and a second portion of the billing information representing bills for a second payor;

a processor configured to generate a first notice of availability of the bills for the first payor represented by the first portion of the billing information, first bill presentment information corresponding to the first portion of the billing information, second bill presentment information corresponding to the second portion of the billing information, a first signal directing transmission of the first notice to the first payor, second signal directing transmission of the first bill presentment information responsive to a first request for current billing information received subsequent to the transmission of the first notice, and a third signal directing transmission of the second bill presentment information responsive to a second request for current billing information; and a network interface configured to receive the first request from the first payor and the second request from the second payor, and to transmit the first notice to the first payor responsive to the first signal, the first bill presentment information to the first payor responsive to the second signal and the second bill presentment information to the second payor responsive to the third signal;

wherein the processor is further configured to generate a second notice of the availability of the bills for the first payor represented by the first portion of the billing information, and a fourth signal directing the transmission of the second notice subsequent to the transmission of the first bill presentment information to the first payor;

wherein the network interface is further configured to transmit the second notice to the first payor responsive to the fourth signal.

5. A system according to claim 4, wherein:

the billing information is first billing information and the plurality of different billers is a plurality of different first billers, wherein:

the processor is further configured to:

direct the storage in memory of the first billing information and second billing information associated with a plurality of different second billers, the first portion of the second billing information representing bills for the first payor, and generate third bill presentment information corresponding to the first portion of the first billing information, excluding that representing bills for which notice of payment has been received, and the first portion of second billing information, and generate a third signal directing the transmission of the third bill presentment information responsive to a third request for then current billing information; and the network interface is further configured to:

receive, subsequent to the receipt of the first billing information, the second billing information, receive the notice of payment of some of the bills represented by the first portion of the first billing information, receive, subsequent to receipt of the notice of payment, the third request from the first payor, and transmit the third bill presentment information, responsive to the third signal.

6. A system according to claim 4, wherein the processor is further configured to generate the second notice and the fourth signal directing the transmission of the second notice if the bills represented by the first portion of the billing information remain unpaid for a specified period of time after transmission of the first bill presentment information to the first payor.

7. An electronic bill presentment system, comprising:
a memory configured to store billing information associated with a plurality of different billers, a first portion of the billing information representing bills for a first payor and a second portion of the billing information representing bills for a second payor;
a processor configured to generate first bill presentment information corresponding to the first portion of the billing information, second bill presentment information corresponding to the second portion of the billing information, a first signal directing transmission of the first bill presentment information responsive to a first request for current billing information, and a second signal directing transmission of the second bill presentment information responsive to a second request for current billing information; and
a network interface configured to receive the first request from the first payor and the second request from the second payor, and to transmit the first bill presentment information to the first payor responsive to the first signal and the second bill presentment information to the second payor responsive to the second signal;
wherein the processor is further configured to generate a first notice of availability of current billing information, a second notice of availability of current billing information, a third signal directing the transmission of the first notice of availability and a fourth signal directing the transmission of the second notice of availability; and
wherein the network interface is further configured to transmit the first notice to the first payor responsive to the third signal and the second notice to the second payor responsive to the fourth signal.

8. A system according to claim 7, wherein:
the third signal includes a network e-mail address of the first payor and the fourth signal includes a network e-mail address of the second payor.

9. A system according to claim 8, wherein:
the network e-mail address is the Internet e-mail address.

10. An electronic bill presentment system, comprising:
a memory configured to store billing information associated with a plurality of different billers, a first portion of the billing information representing bills for a first payor and a second portion of the billing information representing bills for a second payor;
a processor configured to generate first bill presentment information corresponding to the first portion of the billing information, second bill presentment information corresponding to the second portion of the billing information, a first signal directing transmission of the first bill presentment information responsive to a first request for current billing information, and a second signal directing transmission of the second bill presentment information responsive to a second request for current billing information; and
a network interface configured to receive the first request from the first payor and the second request from the second payor, and to transmit the first bill presentment information to the first payor responsive to the first signal and the second bill presentment information to the second payor responsive to the second signal;
wherein the processor is further configured to generate a first notice of availability of current billing information and a third signal directing the transmission of the first notice of availability and a second notice of availability of current billing information and a fourth signal directing the transmission of the second notice of availability; and
wherein the network interface is further configured to transmit the first notice to the first payor responsive to the third signal and the second notice to the first payor responsive to the fourth signal; and
wherein the first request is received subsequent to the transmission of the first notice and the second notice is transmitted subsequent to the receipt of the of the first request.

11. A system according to claim 10, wherein:
the processor is configured to generate the second notice and the fourth signal only if the bills represented by the first portion of the billing information remain unpaid for a period of time after generation of the third signal.

12. An electronic bill presentment system, comprising:
a memory configured to store first billing information associated with a plurality of different first billers, a first portion of the first billing information representing bills for a first payor and a second portion of the first billing information representing bills for a second payor;
a processor configured to generate first bill presentment information corresponding to the first portion of the first billing information, second bill presentment information corresponding to the second portion of the first billing information, a first signal directing transmission of the first bill presentment information responsive to a first request for current billing information, and a second signal directing transmission of the second bill presentment information responsive to a second request for current billing information; and
a network interface configured to receive the first request from the first payor and the second request from the second payor, and to transmit the first bill presentment information to the first payor responsive to the first signal and the second bill presentment information to the second payor responsive to the second signal;
wherein the processor is further configured to:
direct the storage of the first billing information and second billing information associated with a plurality of different second billers in the memory, and
generate third bill presentment information corresponding to at least a part of the first portion of the first billing information and a first portion of the second billing information, the first portion of the second billing information representing bills for the first payor, and
generate a third signal directing the transmission of the third bill presentment information responsive to a third request for then current billing information; and
wherein the network interface is further configured to:
receive the first billing information,
receive the second billing information,
receive the third request from the first payor, and
transmit the third bill presentation information to the first payor responsive to the third signal.

13. An electronic bill presentment system, comprising:
a memory configured to store first billing information associated with a plurality of different first billers, a first portion of the first billing information representing bills for a first payor and a second portion of the first billing information representing bills for a second payor;
a processor configured to generate first bill presentment information corresponding to the first portion of the first billing information, second bill presentment information corresponding to the second portion of the first billing information, a first signal directing transmission of the first bill presentment information responsive to a first request for current billing information, and a second signal directing transmission of the second bill presentment information responsive to a second request for current billing information; and
a network interface configured to receive the first request from the first payor and the second request from the second payor, and to transmit the first bill presentment information to the first payor responsive to the first signal and the second bill presentment information to the second payor responsive to the second signal;
wherein the processor is further configured to:
direct the storage in memory of the first billing information and second billing information associated with a plurality of different second billers, the first portion of the second billing information representing bills for the first payor, and
generate third bill presentment information corresponding to the first portion of the first billing information, excluding that representing bills for which notice of payment has been received, and the first portion of second billing information, and
generate a third signal directing the transmission of the third bill presentment information responsive to a third request for then current billing information; and
wherein the network interface is further configured to:
receive, subsequent to the receipt of the first billing information, the second billing information,
receive the notice of payment of some of the bills represented by the first portion of the first billing information,
receive, subsequent to receipt of the notice of payment, the third request from the first payor, and
transmit the third bill presentment information, responsive to the third signal.

14. An electronic bill presentment system, comprising:
a memory configured to store billing information associated with a plurality of different billers, a first portion of the billing information representing bills for a first payor and a second portion of the billing information representing bills for a second payor;
a processor configured to generate first bill presentment information corresponding to the first portion of the billing information, second bill presentment information corresponding to the second portion of the billing information, a first signal directing transmission of the first bill presentment information responsive to a first request for current billing information, and a second signal directing transmission of the second bill presentment information responsive to a second request for current billing information; and
a network interface configured to receive the first request from the first payor and the second request from the second payor, and to transmit the first bill presentment information to the first payor responsive to the first signal and the second bill presentment information to the second payor responsive to the second signal;
wherein the processor is further configured to:
generate the first bill presentment information to include a listing, displayable as single page, of respective billed amounts paid by the first payor to each of more than one of the plurality of the different billers; and
generate the second bill presentment information to include a listing, displayable as single page, of respective billed amounts paid by the second payor to each of more than one of the plurality of the different billers.

15. An electronic bill presentment system, comprising:
a memory configured to store first billing information associated with a plurality of different first billers, a first portion of the first billing information representing bills for a first payor and a second portion of the first billing information representing bills for a second payor;
a processor configured to generate first bill presentment information corresponding to the first portion of the first billing information, second bill presentment information corresponding to the second portion of the first billing information, a first signal directing transmission of the first bill presentment information responsive to a first request for current billing information, and a second signal directing transmission of the second bill presentment information responsive to a second request for current billing information; and
a network interface configured to receive the first request from the first payor and the second request from the second payor, and to transmit the first bill presentment information to the first payor responsive to the first signal and the second bill presentment information to the second payor responsive to the second signal;
wherein the processor is further configured to:
generate third bill presentation information corresponding to a first portion of second billing information associated with a plurality of different second billers, the first portion of the second billing information representing bills for the first payor,
generate, prior to receipt of the second billing information, a first notice of the availability of the first bill presentation information and a third signal directing transmission of the first notice,
generate, subsequent to transmission of the first bill presentment information and the receipt of the second billing information, a second notice of the availability of the first bill presentment information and the third bill presentment information and a fourth signal directing transmission of the second notice, and
generate a fifth signal directing the transmission of the first and third bill presentment information responsive to a third request for current billing information responsive to a third request for then current billing information; and
wherein the network interface is further configured to:
receive the first billing information,
receive the second billing information subsequent to receipt of the first billing,
transmit, prior to the receipt of the second billing information, the first notice to the first payor responsive to the third signal, transmit the second notice to the first payor responsive to the fourth signal, receive, subsequent to transmission of the second notice, the third request from the first payor, and transmit the first and the third bill presentation information to the first payor responsive to the fifth signal.

16. An electronic bill presentment network, comprising:

a communications network;

a plurality of biller stations each configured to transmit billing information associated with a respective one of a plurality of different billers via the network;

a network server configured to (i) receive the transmitted billing information, (ii) store the received billing information such that a first portion of the billing information representing bills for a first payor is associated with the first payor and a second portion of the billing information representing bills for a second payor is associated with the second payor, and (iii) transmit, via the network, a first notice of the availability of the bills represented by the first portion of the billing information to the first payor and a second notice of the availability of the bills represented by the second portion of the billing information to the second payor;

a first client station configured to receive the first notice and to transmit, via the network, a first payor request for current billing information; and a second client station configured to receive the second notice and to transmit, via the network, a second payor request for current billing information;

wherein the network server is further configured to receive the first payor request and to transmit first bill presentment information corresponding to the first portion of the billing information via the network responsive to the first request, to receive the second payor request and to transmit second bill presentment information and second bill presentment information corresponding to the second portion of the billing information via the network responsive to the second request, and to transmit, via the network, a third notice of the availability of the bills represented by the first portion of the billing information to the first payor following transmission of the first bill presentment information, and a fourth notice of the availability of the bills represented by the second portion of the billing information to the second payor following transmission of the second bill presentment information.

17. A network according to claim 16, wherein:

the communications network is the Internet.

18. A network according to claim 16, wherein:

the first client station is configured to transmit, subsequent to the transmission of the first payor request, another first payor request for then current billing information via the network; and the network server is further configured to receive notification of the payment of some of the bills represented by the first portion of the billing information, to receive the other first payor request after receipt of the notice of payment, and to transmit the first bill presentment information corresponding to the first portion of the billing information representing only the remaining unpaid bills via the network responsive to the other first payor request.

19. A network according to claim 16, wherein the network server is further configured to transmit the third notice if the bills represented by the first portion of the billing information remain unpaid after a specified period of time following transmission of the first bill presentment information, and to transmit the fourth notice if the bills represented by the second portion of the billing information remain unpaid after a specified period of time following transmission of the second bill presentment information.

\* \* \* \* \*